US008828581B2

(12) United States Patent
Godden

(10) Patent No.: US 8,828,581 B2
(45) Date of Patent: Sep. 9, 2014

(54) LIQUID BATTERY FORMED FROM ENCAPSULATED COMPONENTS

(75) Inventor: Glenn Godden, Edmonds, WA (US)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/816,435

(22) PCT Filed: Apr. 9, 2012

(86) PCT No.: PCT/US2012/032753

§ 371 (c)(1),
(2), (4) Date: Feb. 11, 2013

(87) PCT Pub. No.: WO2012/139107

PCT Pub. Date: Oct. 11, 2012

(65) Prior Publication Data

US 2013/0143147 A1 Jun. 6, 2013

(30) Foreign Application Priority Data

Apr. 8, 2011 (WO) .................. PCT/US2011/03178
Jun. 6, 2011 (WO) .................. PCT/US2011/03928

(51) Int. Cl.
| | | |
|---|---|---|
| H01M 2/14 | (2006.01) | |
| H01M 8/20 | (2006.01) | |
| A23F 5/00 | (2006.01) | |
| C12G 3/08 | (2006.01) | |
| H01M 6/36 | (2006.01) | |
| A23F 3/14 | (2006.01) | |
| A23L 2/52 | (2006.01) | |
| H01M 8/18 | (2006.01) | |

(52) U.S. Cl.
CPC . *H01M 8/20* (2013.01); *A23F 5/00* (2013.01); *Y02E 60/12* (2013.01); *C12G 3/08* (2013.01); *H01M 6/36* (2013.01); *A23F 3/14* (2013.01); *A23L 2/52* (2013.01); *H01M 8/188* (2013.01)
USPC ........... 429/132; 429/131; 429/163; 429/167; 429/249; 429/255

(58) Field of Classification Search
CPC ............... A23F 3/14; A23F 5/00; A23L 2/00; A23L 2/52; A61Q 11/00; C12G 3/00; C12G 3/08; H01M 6/36; H01M 8/188; H01M 8/20; H01M 10/0565; H01M 2002/02; H01M 2004/02; H01M 2004/025; Y02E 60/12
USPC ......... 429/515, 516, 131, 132, 163, 167, 249, 429/255
See application file for complete search history.

(56) References Cited

U.S. PATENT DOCUMENTS

| | | |
|---|---|---|
| 4,055,291 A | 10/1977 | Peters |
| 4,461,403 A | 7/1984 | Prahs |

(Continued)

FOREIGN PATENT DOCUMENTS

| | | |
|---|---|---|
| AU | 1305188 A | 9/1989 |
| AU | 2002358277 A1 | 7/2003 |

(Continued)

OTHER PUBLICATIONS

Battery (electricity), http://en.wikipedia.org/wiki/Battery_%28electricity%29, (printed from Internet Nov. 13, 2013).

(Continued)

*Primary Examiner* — Patrick Ryan
*Assistant Examiner* — Ben Lewis
(74) *Attorney, Agent, or Firm* — Pepper Hamilton LLP

(57) ABSTRACT

An apparatus includes at least one battery storage compartment configured to store one or more encapsulated anodes and one or more encapsulated cathodes and at least one beverage storage compartment configured to store at least a component of a beverage. The apparatus also includes a manifold operably connected to the at least one battery storage compartment and to the at least one beverage storage compartment. The manifold is configured to receive at least one of the one or more encapsulated anodes, at least one of the one or more encapsulated cathodes, and at least a portion of the component of the beverage to form a battery that is configured to generate an electrical current.

24 Claims, 13 Drawing Sheets

(56) References Cited

U.S. PATENT DOCUMENTS

| | | | |
|---|---|---|---|
| 4,746,221 A | 5/1988 | Okumura et al. | |
| 4,808,496 A | 2/1989 | Hope et al. | |
| 5,020,694 A | 6/1991 | Pettengill | |
| 5,569,368 A | 10/1996 | Larsky et al. | |
| 6,230,052 B1 | 5/2001 | Wolff et al. | |
| 6,383,536 B1 | 5/2002 | Palmer et al. | |
| 6,395,428 B1 | 5/2002 | Kezuka | |
| 6,416,800 B1 | 7/2002 | Weber et al. | |
| 7,008,722 B2 | 3/2006 | Huang | |
| 7,378,450 B2 | 5/2008 | Erkey et al. | |
| 7,476,221 B2 | 1/2009 | Sun et al. | |
| 7,476,222 B2 | 1/2009 | Sun et al. | |
| 7,477,939 B2 | 1/2009 | Sun et al. | |
| 7,477,941 B2 | 1/2009 | Sun et al. | |
| 7,477,947 B2 | 1/2009 | Pines et al. | |
| 7,632,533 B2 | 12/2009 | Fotland et al. | |
| 8,007,935 B2 | 8/2011 | He et al. | |
| 2002/0029973 A1 | 3/2002 | Maydan | |
| 2003/0091895 A1 | 5/2003 | Zocchi | |
| 2003/0102874 A1 | 6/2003 | Lane et al. | |
| 2004/0029982 A1 | 2/2004 | Erkey et al. | |
| 2004/0070371 A1 | 4/2004 | Chern et al. | |
| 2004/0071866 A1 | 4/2004 | Park et al. | |
| 2004/0141908 A1 | 7/2004 | Hara et al. | |
| 2004/0164096 A1 | 8/2004 | Engel et al. | |
| 2005/0013862 A1* | 1/2005 | Tobyn et al. | 424/472 |
| 2005/0089548 A1 | 4/2005 | Virgalitto et al. | |
| 2006/0261823 A1 | 11/2006 | Parker | |
| 2007/0060862 A1 | 3/2007 | Sun et al. | |
| 2007/0123772 A1 | 5/2007 | Euliano et al. | |
| 2007/0142222 A1 | 6/2007 | Erkey et al. | |
| 2007/0236867 A1 | 10/2007 | Hossick-Schott et al. | |
| 2007/0282387 A1 | 12/2007 | Starkebaum | |
| 2007/0286929 A1 | 12/2007 | Andersen | |
| 2008/0009775 A1 | 1/2008 | Murison | |
| 2008/0050490 A1 | 2/2008 | Stalder et al. | |
| 2008/0171266 A1 | 7/2008 | Kato et al. | |
| 2008/0284599 A1 | 11/2008 | Zdeblick et al. | |
| 2009/0010998 A1 | 1/2009 | Marchitto et al. | |
| 2009/0136834 A1 | 5/2009 | Coowar et al. | |
| 2009/0270788 A1* | 10/2009 | Marenus et al. | 604/20 |
| 2009/0286153 A1 | 11/2009 | He et al. | |
| 2009/0314336 A1 | 12/2009 | Nakatani et al. | |
| 2010/0055570 A1 | 3/2010 | Rodriguez | |
| 2010/0057147 A1 | 3/2010 | Fassih et al. | |
| 2010/0082088 A1 | 4/2010 | Fassih et al. | |
| 2010/0209515 A1 | 8/2010 | Chantalat et al. | |
| 2010/0239616 A1* | 9/2010 | Hafezi et al. | 424/400 |
| 2010/0298668 A1 | 11/2010 | Hafezi et al. | |
| 2011/0052764 A1 | 3/2011 | Bulgin | |
| 2011/0065983 A1 | 3/2011 | Hafezi et al. | |
| 2011/0184482 A1* | 7/2011 | Eberman et al. | 607/5 |
| 2012/0021014 A1 | 1/2012 | Chantalat et al. | |

FOREIGN PATENT DOCUMENTS

| | | |
|---|---|---|
| AU | 2008281632 A1 | 2/2009 |
| AU | 2009281876 A1 | 2/2010 |
| CA | 2734251 A | 2/2010 |
| CN | 1617765 A | 5/2005 |
| CN | 101174681 A | 5/2008 |
| CN | 101227001 A | 7/2008 |
| CN | 101174681 B | 5/2010 |
| CN | 101227001 B | 9/2011 |
| CN | 102176862 A | 9/2011 |
| EP | 1494807 A2 | 1/2005 |
| EP | 1959023 A1 | 8/2008 |
| EP | 2057703 A1 | 5/2009 |
| EP | 2173323 A2 | 4/2010 |
| EP | 1959023 B1 | 5/2010 |
| EP | 2313003 A2 | 4/2011 |
| FI | 20065423 A | 12/2007 |
| GB | 2451503 A | 2/2009 |
| GB | 2455184 A | 6/2009 |
| JP | 2004134351 A | 4/2004 |
| JP | 2005209819 A | 8/2005 |
| JP | 2006504508 A | 2/2006 |
| JP | 2007323878 A | 12/2007 |
| JP | 2008171767 A | 7/2008 |
| JP | 4199811 B2 | 12/2008 |
| JP | 2012500055 A | 1/2012 |
| KR | 20040032421 A | 4/2004 |
| KR | 20110041563 A | 4/2011 |
| MX | PA04006324 A | 3/2005 |
| TW | 200930415 A | 7/2009 |
| WO | WO 03/057367 A2 | 7/2003 |
| WO | WO2005/004981 A2 | 1/2005 |
| WO | WO2005/004983 A2 | 1/2005 |
| WO | WO2005/045977 A2 | 5/2005 |
| WO | WO2007/147942 A1 | 12/2007 |
| WO | WO2008/052136 A2 | 5/2008 |
| WO | WO2008/052394 A1 | 5/2008 |
| WO | WO2009/016350 A2 | 2/2009 |
| WO | WO2009/045720 A2 | 4/2009 |
| WO | WO2010/019778 A2 | 2/2010 |
| WO | WO2010/111511 A1 | 9/2010 |
| WO | WO2012/012509 A1 | 1/2012 |
| WO | WO2012/138352 A1 | 10/2012 |
| WO | WO2012/138354 A1 | 10/2012 |
| WO | WO2012/138361 A1 | 10/2012 |
| WO | WO2012/139100 A1 | 10/2012 |
| WO | WO2012/139107 A1 | 10/2012 |
| WO | WO2012/139109 A1 | 10/2012 |

OTHER PUBLICATIONS

Brinn, Israeli project develops novel solution to dry mouth, http://www.israel21c.org/health/israeli-project-develops-novel-solution-to-dry-mouth, Feb. 27, 2005.

Ecoupled, From the Store Shelf to Home (and Beyond), Ecoupled Wireless Power at 2011 CES, Jan. 7, 2011.

Electrochemical cell, http://en.wikipedia.org/wiki/Electrochemical_cell, (printed from Internet Nov. 13, 2013).

Just et al., BOLD responses to trigeminal nerve stimulation, *Magnetic Resonance Imaging* (2010), 28:1143-1151.

Pop Rocks, http://en.wikipedia.org/wiki/Pop_Rocks, (printed from Internet Nov. 13, 2013.

International Search Report and Written Opinion for PCT/US2011/031780 dated Sep. 15, 2011.

International Search Report and Written Opinion for PCT/US2011/039281 dated Sep. 22, 2011.

International Search Report and Written Opinion for PCT/US2011/031783 dated Aug. 17, 2011.

International Search Report and Written Opinion for PCT/US2011/031791 dated Jul. 7, 2011.

International Search Report and Written Opinion for PCT/US2012/032731 dated Jun. 22, 2012.

International Search Report and Written Opinion for PCT/US2012/032753 dated Jul. 19, 2012.

International Search Report and Written Opinion for PCT/US2012/032757 dated May 31, 2012.

Acmella oleracea, http://en.wikipedia.org/wiki/Acmella_oleracea (Printed from Internet Jan. 9, 2013).

Benwick, Like a Taste That Tingles? Then This Bud's for You, *The Washington Post* (Oct. 3, 2007).

Cass, Battery storage could get a huge boost from seaweed, Technology Review (Sep. 8, 2011, http://www.technologyreview.com/news/425374/battery-storage-could-get-a-huge-boost-from-seaweed/.

Edible Computer Chips: Nanotechnology, http://www.ediblecomputerchips.com (Jan. 2009).

Kendrick, Tasting the Light: Device Lets the Blind "See" with Their Tongues, *Scientific American* (Aug. 13, 2009).

Lawless et al., Metallic Taste from Electrical and Chemical Stimulation, *Chem. Senses* (2005), 30(3):185-194.

(56) References Cited

OTHER PUBLICATIONS

Ramsewak et al., Bioactive N-Isobutylamides from the Flower Buds of *Spilanthes acmella*, (Jul. 1999), 51(6):729-732 (Abstract).

Solid-State Batteries, the Power of the Press, *The Economist* (Jan. 27, 2011), http://www.economist.com/node/18007516.
Stevens et al., A Direct Comparison of the Taste of Electrical and Chemical Stimuli, *Chem. Senses* (Mar. 2, 2008), 33:405-413.

* cited by examiner

US 8,828,581 B2

LIQUID BATTERY FORMED FROM ENCAPSULATED COMPONENTS

REFERENCE TO RELATED APPLICATIONS

Claim of Priority

This application is a U.S. national stage filing under 35 U.S.C. §371 of International Application No. PCT/US2012/032753 filed Apr. 9, 2012 entitled "Liquid Battery Formed From Encapsulated Components" the disclosure of which is incorporated by reference in its entirety. International Application No. PCT/US2012/032753 filed Apr. 9, 2012 entitled "Liquid Battery Formed From Encapsulated Components" further claims benefit of and priority to PCT International Application No. PCT/US2011/039281 entitled "LIQUID BATTERY FORMED FROM ENCAPSULATED COMPONENTS" filed on Jun. 6, 2011, and also claims benefit of and priority to PCT International Application No. PCT/US2011/031780 entitled "GEL FORMED BATTERY" filed on Apr. 8, 2011, each of which is hereby incorporated by reference in its entirety.

BACKGROUND

The following description is provided to assist the understanding of the reader. None of the information provided or references cited is admitted to be prior art.

A battery is an electro-chemical device that converts chemical energy into electrical energy. A battery generally includes an anode and a cathode, which are connected by an electrolyte. The electrolyte can be a wet electrolyte or a dry electrolyte that is activated by moisture. When the battery is in operation, a redox reaction occurs. During the redox reaction, reduction occurs to cations at the cathode and oxidization occurs to anions at the anode. The battery has a terminal voltage, which is measured as the difference of voltage between the anode and cathode.

SUMMARY

An illustrative apparatus includes at least one battery storage compartment configured to store one or more encapsulated anodes and one or more encapsulated cathodes and at least one beverage storage compartment configured to store at least a component of a beverage. The illustrative apparatus also includes a manifold operably connected to the at least one battery storage compartment and to the at least one beverage storage compartment. The manifold is configured to receive at least one of the one or more encapsulated anodes, at least one of the one or more encapsulated cathodes, and at least a portion of the component of the beverage to form a battery that is configured to generate an electrical current.

In one embodiment, the one or more encapsulated anodes and the one or more encapsulated cathodes are spheres. In another embodiment, each of the one or more encapsulated anodes includes a first membrane configured to encapsulate an anode, and each of the one or more encapsulated cathodes include a second membrane configured to encapsulate a cathode. In yet another embodiment, the anode includes a liquid anode. In another embodiment, the cathode includes a liquid cathode. In one embodiment, the anode includes a food grade anode, and the cathode includes a food grade cathode. The food grade anode includes at least one of zinc sulfate, zinc, or nickel, and the food grade cathode includes at least one of copper sulfate, copper, carbon, manganese dioxide, or iron. In another embodiment, at least one of the food grade anode and the food grade cathode includes a vitamin that is configured to be administered via the battery.

In another embodiment, the component of the beverage is configured to be an electrolyte of the battery. The electrolyte can be at least one of phosphoric acid, ascorbic acid, citric acid, or salt.

In another embodiment, the at least one battery storage compartment includes a single battery storage compartment. In yet another embodiment, the at least one battery storage compartment includes a first compartment configured to store the one or more encapsulated anodes and a second compartment configured to store the one or more encapsulated cathodes.

In yet another embodiment, the at least one battery storage compartment is further configured to store the one or more encapsulated anodes and the one or more encapsulated cathodes under pressure. In one embodiment, the one or more encapsulated anodes and the one or more encapsulated cathodes are configured to rupture upon release from the at least one battery storage compartment. In another embodiment, the manifold is further configured to rupture the one or more encapsulated anodes and the one or more encapsulated cathodes. In yet another embodiment, the component of the beverage is configured to dissolve the first membrane and the second membrane.

In another embodiment, the at least one battery storage compartment is further configured to store carbonated water. In other embodiments, the component of the beverage can be concentrate syrup or fruit juice.

In one embodiment, the battery is configured to increase production of saliva. In another embodiment, the battery includes a drug. In a related embodiment, the electrical current is configured to enhance absorption of the drug in a subject. In another embodiment, the electrical current has anti-bacterial properties In another embodiment, the at least one battery storage compartment is further configured to store one or more encapsulated electrolytes. Each of the one or more encapsulated electrolytes includes a membrane configured to encapsulate an electrolyte.

Another illustrative apparatus includes a storage compartment configured to store a liquid. The liquid includes one or more encapsulated anodes, one or more encapsulated cathodes, and an electrolyte. An actuator is configured to dispense at least a portion of the liquid. The one or more encapsulated anodes and the one or more encapsulated cathodes are configured to rupture to form a battery that is configured to generate an electrical current. The liquid can include a mouthwash, a detergent, or a hair dye. In some embodiments, the electrical current can be configured to reduce flora within a mouth or enhance application of a hair dye.

An illustrative process includes storing one or more encapsulated anodes and one or more encapsulated cathodes in at least one battery storage compartment. The process also includes storing a component of a beverage in a beverage storage compartment, and placing a manifold in fluid communication with the at least one battery storage compartment and the beverage storage compartment. The manifold is configured to receive the one or more encapsulated anodes, the one or more encapsulated cathodes, and the component of the beverage. Upon rupturing, the one or more encapsulated anodes and the one or more encapsulated cathodes form a battery that generates an electrical current. In another embodiment, the process includes storing carbonated water in the at least one battery storage compartment.

Another illustrative process for treating a condition includes releasing one or more encapsulated anodes and one or more encapsulated cathodes from at least one battery storage compartment. The process also includes releasing a liquid from a liquid storage compartment, and mixing the one or more encapsulated anodes, the one or more encapsulated cathodes, and the liquid. The mixing causes at least a portion of the one or more encapsulated anodes and at least a portion of the one or more encapsulated cathodes to rupture to form a battery that is configured to generate an electrical current. The battery is administered to treat a condition. In some embodiments, the condition treated includes dry mouth or gum disease. In another embodiment, the electrical current reduces flora within a mouth.

Another illustrative apparatus includes means for storing encapsulated anodes, means for storing encapsulated cathodes, and means for storing a component of a beverage. The apparatus also includes means for combining at least a portion of the encapsulated anodes, at least a portion of the encapsulated cathodes, and at least a portion of the component of the beverage to form an active battery that is configured to generate an electrical current.

In an embodiment, a battery comprises: one or more encapsulated anodes comprising a liquid anode material surrounded by an anodic membrane; one or more encapsulated cathodes comprising a liquid cathode material surrounded by a cathodic membrane; and an electrolyte, wherein the one or more encapsulated anodes, the one or more encapsulated cathodes, and the electrolyte are configured to generate an electrical current upon a breach of the anodic membrane and the cathodic membrane.

In an embodiment, an encapsulated battery component comprises: a battery component selected from an electrode, an electrolyte, or any combination thereof; and an encapsulating material which coats substantially the entirety of the battery component.

In an embodiment, a method of making an encapsulated battery component comprises: combining at least one battery component and a first membrane forming substance in a first liquid to form a first solution; combining a second membrane forming substance in a second liquid to form a second solution; and adding either a portion of the first solution to the second solution or a portion of the second solution to the first solution to form an encapsulated battery component, wherein the battery component is an electrode, an electrolyte, or any combination thereof.

In an embodiment, a composition comprises: a carrier liquid; and a battery, wherein the battery comprises: one or more encapsulated anodes comprising an liquid anode material surrounded by an anodic membrane; one or more encapsulated cathodes comprising a liquid cathode material surrounded by a cathodic membrane; and an electrolyte, wherein the one or more encapsulated anodes, the one or more encapsulated cathodes, and the electrolyte are configured to generate an electrical current upon a breach of the anodic membrane and the cathodic membrane within the carrier liquid.

In an embodiment, a composition includes: a carrier liquid; and at least one battery component, wherein the battery component may be selected from: one or more encapsulated anodes comprising an anode material surrounded by an anodic membrane; one or more encapsulated cathodes comprising a cathode material surrounded by a cathodic membrane; an electrolyte; or any combination thereof. In some embodiments, the electrolyte may be an encapsulated electrolyte comprising an electrolyte material surrounded by an electrolytic membrane.

In an embodiment, a kit comprises: battery components including one or more encapsulated anodes comprising an liquid anode material surrounded by an anodic membrane and one or more encapsulated cathodes comprising a liquid cathode material surrounded by a cathodic membrane; and a container for storing the battery components, wherein opening the container allows the battery components to be introduced to a carrier liquid and to generate an electrical current upon a breach of the anodic membrane and the cathodic membrane within the carrier liquid.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
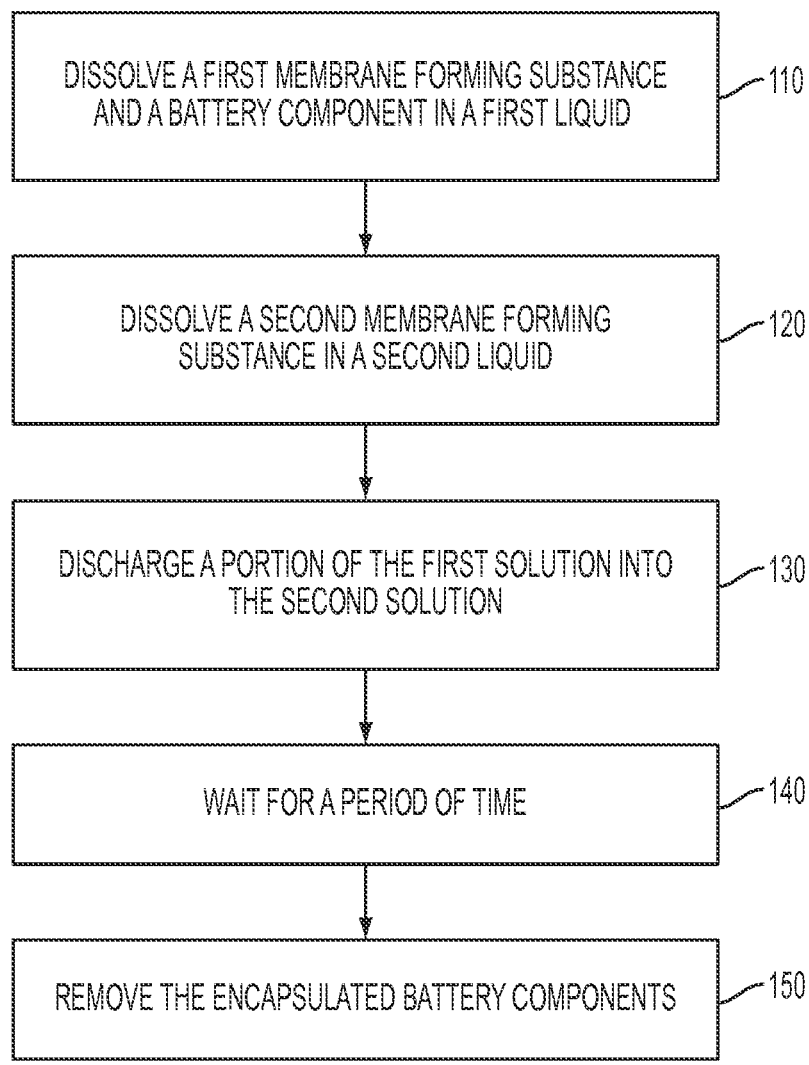
FIG. 1 is a flow diagram depicting operations performed in forming encapsulated battery components in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are illustrative methods and apparatuses relating to a battery that is configured to deliver an electrical current. Components of the battery can be in a liquid form and can be encapsulated in a shell or membrane that can be ruptured or dissolved to form the battery. Non-limiting uses of the battery may include incorporating the battery into beverages, mouthwashes, liquid medicines such as a cough syrup, cleaners, liquid soaps, shampoos, eye drops, etc. The battery can also be used to treat a condition such as, but not limited to, dry mouth by increasing saliva production, canker sores, etc. In one illustrative embodiment, components of the battery can include encapsulated anodes, encapsulated cathodes, and encapsulated or unencapsulated electrolytes. In other embodiments, one or more battery components are encapsulated and one or more different battery components are unencapsulated. In yet another embodiment, all of the battery components are encapsulated. The components may be composed of food grade materials that are safe for human consumption. Non-limiting examples of food-grade anodes include zinc sulfate, zinc, zinc oxide, or nickel. The food-grade cathodes may be, but is not limited to, copper sulfate, copper gluconate, copper, carbon, manganese dioxide, and iron. Non-limiting examples of a food-grade electrolyte include phosphoric acid, ascorbic acid, citric acid, and salt. A battery can be activated by bringing the components of the battery into contact with one another. In one embodiment, the encapsulated battery components are ruptured or dissolved, allowing all of the battery components to come into contact. Upon activation, an electrical current can produce a noticeable sensation. For example, an edible battery can generate a current that may be felt, for example, in a mouth, gums, lips, stomach, intestines, etc.

It will be understood that the above embodiments and configurations are given as illustrative examples only and that other configurations of the battery will be apparent to those of skill in the art in light of the present disclosure. Additional details and embodiments are described with reference to the figures.

An illustrative battery can include various components, such as, but not limited to, an anode, cathode, and an electrolyte. One or more of these components can be encapsulated. FIG. 1 is a flow diagram depicting operations performed in forming encapsulated battery components in accordance with an illustrative embodiment. In an operation 110, a first membrane forming substance and a battery component, such as a cathode, anode, or electrolyte, are dissolved in a first liquid to form a first solution. In an illustrative embodiment, the first membrane forming substance can be sodium alginate. Alternatively, ammonium alginate, potassium alginate, and/or other alginate derivatives may be used as the first membrane forming substance. The first liquid can include, but is not limited to, water, fruit juice, soft drink, tea, coffee, energy drink, alcoholic drink, other beverage, etc. The first solution can be transferred to a container to allow any air bubbles to be removed. Vibrating the first solution or pulling a vacuum on the first solution can help remove entrained air.

In an operation 120, a second membrane forming substance is dissolved in a second liquid to form a second solution. The second liquid can be the same as or different from the first liquid, depending on the embodiment. In an illustrative embodiment, the second membrane forming substance can be calcium chloride, calcium carbonate, calcium lactate gluconate, or sodium citrate. In an embodiment, in addition to the second membrane forming substance, one or more battery components can also be dissolved in the second liquid. At least a portion of the first solution is discharged into the second solution in an operation 130. In another embodiment, the second solution can be discharged into the first solution. As an example, the second solution can include calcium lactate gluconate, which can be discharged into a first solution including sodium alginate. In one embodiment, a syringe can be used to discharge drops of the first solution into the second solution, and each drop can form a membrane. Alternatively, any other method known to those of skill in the art for combining the solutions may be used.

In an illustrative embodiment, the second solution reacts with the first solution to form membranes that encapsulate a portion of the first solution. If the battery component included in the first solution is an anode, each membrane can form an encapsulated anode. Similarly, if the battery component included in the first solution is a cathode, each membrane can form an encapsulated cathode. If the battery component included in the first solution is an electrolyte, each membrane can form an encapsulated electrolyte. In an illustrative embodiment, the membrane can form in the shape of a sphere. In an alternative embodiment, other shapes may be formed. The size of the sphere can depend at least in part on the concentration of the second membrane forming substance in the second solution, with a higher concentration resulting in larger spheres. In an illustrative embodiment, the diameter of the spheres can range in size including, but not limited to, 0.025 inches (in), 0.05 in., 0.08 in, 0.1 in., etc.

In an operation 140, the drops (or other portions) of the second solution are left in the first solution for a period of time. The longer the drops or other portions of the second solution are left in the first solution, the thicker the membranes become. The second solution can be left in the first solution for a period of time including, but not limited to, 15 seconds (s), 30 s, 45 s, 60 s, 120 s, 180 s, etc. The thickness of the membrane walls can range in size including, but not limited to, 0.005 in., 0.010 in., 0.020 in., etc. In an operation 150, the encapsulated battery components are removed from the first solution. In one embodiment, the encapsulated battery components can be placed in a cold water bath to stop the membrane forming process. In one embodiment, the encapsulated battery components are placed in cold water for several minutes. The encapsulation process can be repeated to form encapsulated anodes, encapsulated cathodes, and/or encapsulated electrolytes.

In another embodiment, a third membrane forming substance and a battery component, such as a cathode, anode, or electrolyte, are dissolved in a third liquid to form a third solution. The third liquid can be the same as or different from the first or second liquid, depending on the embodiment. The third membrane forming substance can be the same as or different from the first membrane forming substance. In an illustrative embodiment, the third membrane forming substance can be sodium alginate. Alternatively, ammonium alginate, potassium alginate, and/or other alginate derivatives may be used as the third membrane forming substance. In another illustrative embodiment, the battery component included in the first solution is different from the battery component included in the third solution. Drops of the first solution and the third solution can be discharged into the second solution. Encapsulation of the drops starts once the drops are discharged into the second solution. The encapsulated drops can be brought into contact with one another such that the encapsulated battery components are linked together as the membranes form.

In another embodiment, a fourth membrane forming substance and a battery component, such as a cathode, anode, or electrolyte, are dissolved in a fourth liquid to form a fourth solution. For example, the first solution can contain an anode, the third solution can contain a cathode, and the fourth solution can contain an electrolyte. Drops of the first, third, and fourth solution can be discharged in the second solution. An encapsulated anode, cathode, and electrolyte can be brought into contact during membrane formation to form a linked triad of encapsulated battery compartments. In other embodiments, multiple encapsulated components can be joined in any number and any number of shapes, such as, but not limited to, a line, a triad, a square, a pyramid, a cube, etc. In another embodiment, multiple encapsulated battery components of the same type can be linked together during the membrane forming process. As an example, two, three, four, etc. encapsulated cathodes can be linked together, two, three, four, etc. encapsulated anodes can be linked together, etc.

In another embodiment, the membrane forming process can be done in a pressurized environment. In such an embodiment, the encapsulated battery components can be stored under a similar pressure to that of the pressurized environment, such that the membranes do not rupture. The encapsulated battery components can later be dispensed into an environment of a different pressure, such that the different pressure causes the membranes to rupture. In one embodiment, the encapsulated battery components are released into a less pressurized environment, which can cause the encapsulated liquid to expand and rupture the membrane. In another embodiment, the encapsulated battery components are dispensed into an environment with a greater pressure, which can cause the encapsulated liquid to contract and rupture or implode the membrane.

Figure 2:
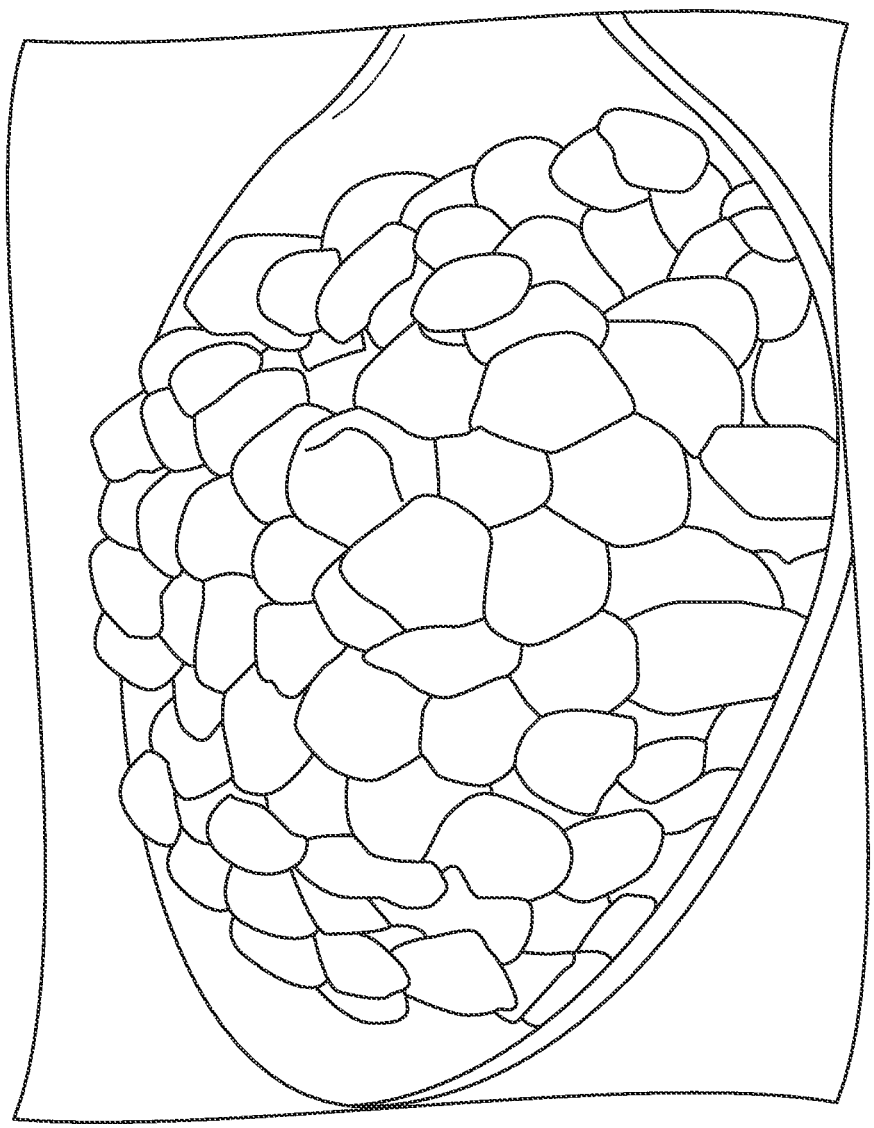
FIG. 2 is an illustration of large scale encapsulation of a liquid in accordance with an illustrative embodiment.

FIG. 2 is an illustration of large scale encapsulation of a liquid in accordance with an illustrative embodiment. The encapsulated spheres shown in FIG. 2 are roughly 0.08 inches in diameter and can contain any combination of an anode, cathode, electrolyte, or liquid.

Figure 3:
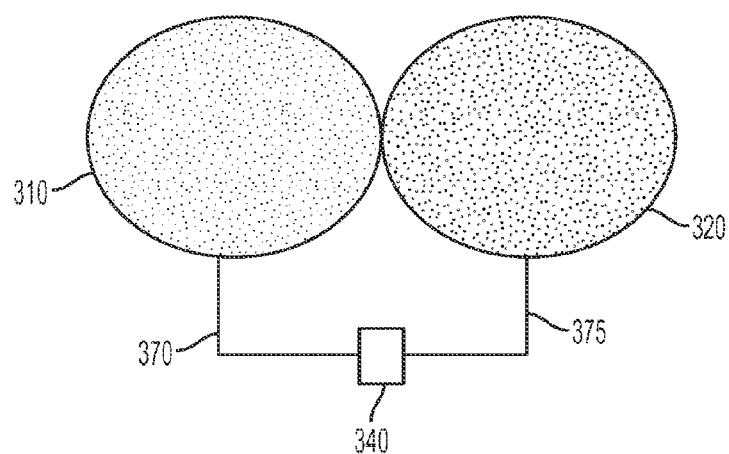
FIG. 3 illustrates a cathode storage compartment and an anode storage compartment in accordance with an illustrative embodiment.

FIG. 3 illustrates a cathode storage compartment 320 and an anode storage compartment 310 for forming a battery in accordance with an illustrative embodiment. In one embodiment, the anode storage compartment 310 and the cathode storage compartment 320 can be incorporated into a dispenser for dispensing products such as, but not limited to, beverages, mouthwashes, shampoos, liquid soaps, lotions, cleaners, etc. In an embodiment, the dispensers can be made of materials that have properties including long life, non-conductive, non-reactive to battery components, mechanically stable, UV/optical protection, etc. In some embodiments, the dispensers can be approved for food storage by the United States Department of Agriculture.

In one embodiment, the cathode storage compartment 320 can store encapsulated cathodes. The cathode storage compartment 320 can also store a liquid such as water, carbonated water, mineral water, a beverage, etc. along with the encapsulated cathodes. The liquid can be unencapsulated, separately encapsulated relative to the cathodes, or encapsulated along with the cathodes, depending on the embodiment. The anode storage compartment 310 can store encapsulated anodes. In another embodiment, the anode storage compartment 310 can store a liquid such as water, carbonated water, mineral water, a beverage, etc. along with the encapsulated anodes. The liquid can be unencapsulated, separately encapsulated relative to the anodes, or encapsulated along with the anodes, depending on the embodiment. In yet another embodiment, the cathode storage compartment 320 can store a non-encapsulated cathode, such as a cathode dissolved in a liquid, while the anode storage compartment 310 can store encapsulated anodes. Similarly, the anode storage compartment 310 can store a non-encapsulated anode, such as an anode dissolved in a liquid, while the cathode storage compartment 320 can store encapsulated cathodes.

Paths 370 and 375 illustrate physical paths that may be traversed by one or more anodes and one or more cathodes, respectively. In one embodiment, the paths 370 and 375 are operably connected to a manifold 340. In some embodiments, the manifold 340 can be configured to rupture encapsulated battery components and/or encapsulated liquids as they are dispensed from the storage compartments. For example, the manifold 340 can include one or more of a screen, a fixed blade, a rotating blade, protrusions, etc. that can rupture encapsulated components as they flow through the manifold 340. The manifold can be a fountain soda dispenser, the mouth of a soda or beverage bottle, the mouth of a soda or beverage can, the mouth of a product bottle such as lotion, toothpaste, hair dye, shampoo, etc., a liquid cheese dispenser, etc. An electrolyte can be incorporated into either or both the encapsulated anode and/or the encapsulated cathode. In another embodiment, the electrolyte can be encapsulated separately from the anodes and the cathodes. In yet another embodiment, the electrolyte can be unencapsulated and be located externally from the encapsulated battery components. Once the encapsulated components are ruptured, the battery components can interact with one another to form a battery.

As discussed in further detail below, a battery may be incorporated into or may form a beverage such as but not limited to, soda, fruit juice, water, carbonated water, mineral water, punches, lemonades, limeades, tea, coffee, beer, wine, etc. A battery can also be incorporated into mouthwashes, liquid medicines such as a cough syrup, cleaners, liquid soaps, shampoos, eye drops, etc. In another embodiment, the encapsulated components can incorporate vitamins and/or minerals. Upon dispensing of a battery, the vitamins and/or minerals can be delivered to a subject.

The battery components may also be incorporated into a pill such as, but not limited to, a vitamin, a mineral, or a drug. As an example, a pill can contain an anode compartment, a cathode compartment, and an electrolyte compartment. The compartments can include encapsulated battery components, unencapsulated battery components, or a mixture of encapsulated and unencapsulated components. In one embodiment, the pill can be chewed to form a battery. In another embodiment, the pill is swallowed and the pill and then any encapsulated components are dissolved internally to form the battery.

Figure 4:
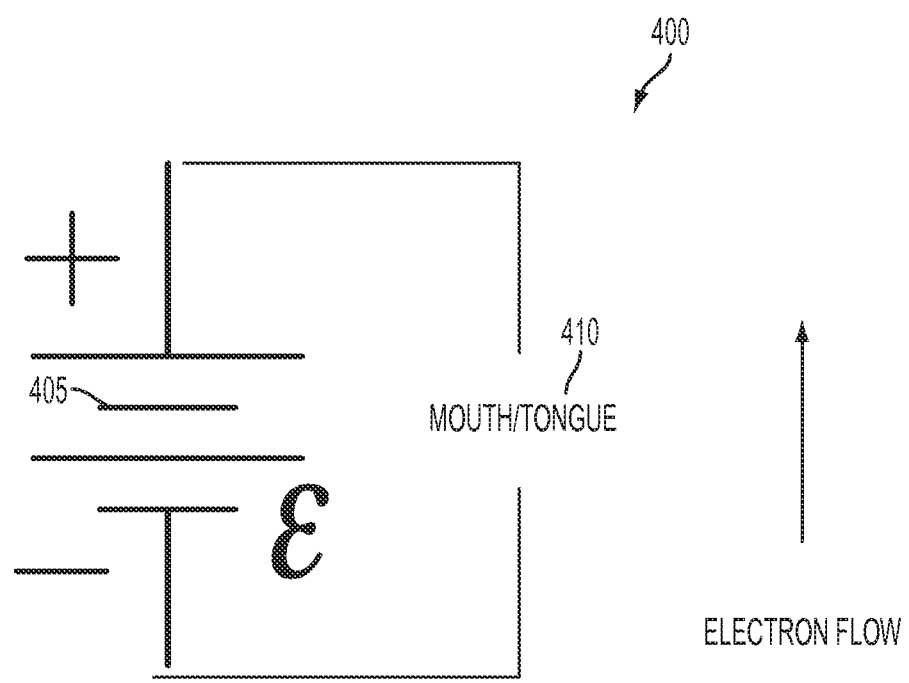
FIG. 4 illustrates an electrical circuit formed in a mouth in accordance with an illustrative embodiment.

FIG. 4 illustrates an electrical circuit 400 that includes a battery 405 and a mouth 410 in which the battery 405 is activated in accordance with an illustrative embodiment. For example, a tongue in the mouth 410 of a subject may connect the anodes and cathodes to form the circuit 400. The circuit 400, however, is not limited to being formed by a tongue. Rather, the circuit 400 may be formed with one or more other parts of the mouth, including, but not limited to, teeth, gums, the walls of the mouth, and/or any fluid that is associated with the mouth 410. Additionally, the circuit 400 is not limited to being formed in the mouth and can be formed on, but not limited to, skin or a scalp. Any conductive surface, such as, but not limited to, a counter top, a floor, a wall, etc. can also be used to connect the anodes and the cathodes to create the circuit 400. Once the circuit 400 is formed, the battery 405 generates a direct current that flows through the circuit 400. In an illustrative embodiment, the current is detectable by a user as a tingling of the parts of the mouth 410 or other body part that forms the circuit 400.

Figure 5:
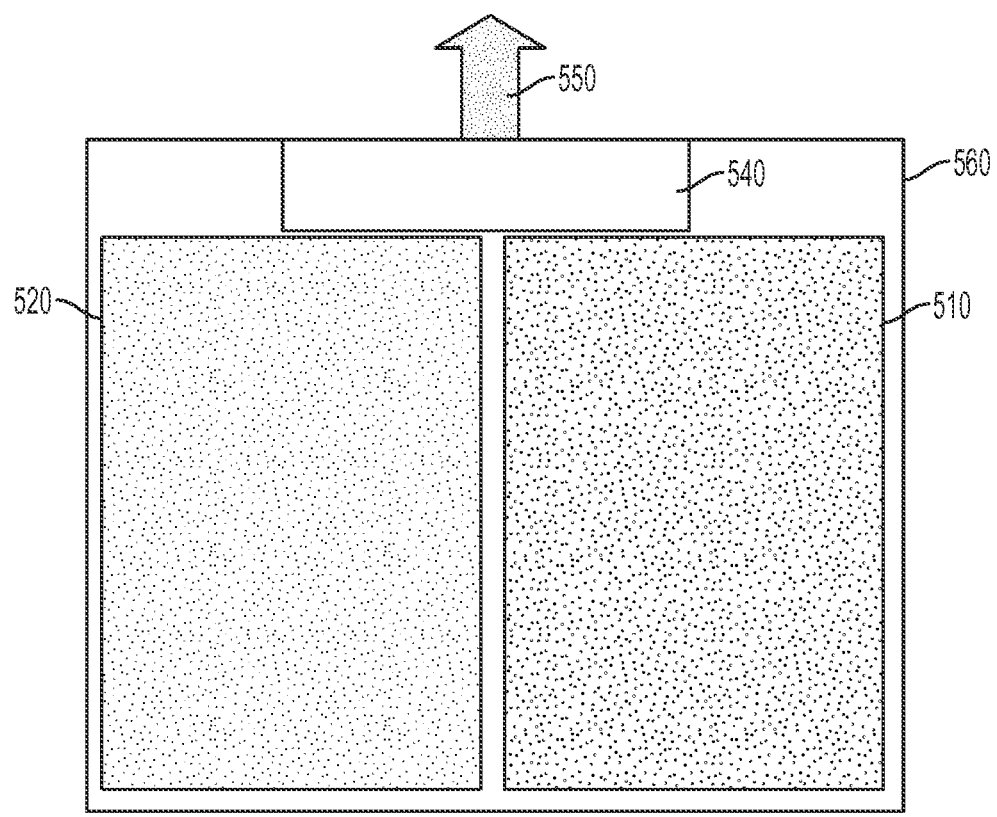
FIG. 5 illustrates two battery storage compartments in accordance with an illustrative embodiment.

FIG. 5 illustrates two battery storage compartments in accordance with an illustrative embodiment. In this embodiment, an anode storage compartment 510 can include encapsulated anodes. In one embodiment, the anode storage compartment 510 also includes a liquid such as, but not limited to, water, carbonated water, mineral water, etc. The liquid and/or the encapsulated anodes can include an electrolyte. In addition, the anode storage compartment 510 can store its contents under pressure. A cathode storage compartment 520 can include encapsulated cathodes. In one embodiment, the cathode storage compartment 520 also includes a liquid such as, but not limited to, water, carbonated water, mineral water, etc. The liquid and/or the encapsulated cathodes can include an electrolyte. In one embodiment, the liquid in the anode storage compartment 510 and/or the cathode storage compartment 520 can be or can include the electrolyte. In addition, the cathode storage compartment 520 can store its contents under pressure. In another embodiment, the electrolyte in the anode storage 510 compartment and/or the cathode storage compartment 520 can also be encapsulated. In yet another embodiment, either the anode or the cathode is not encapsulated. In such an embodiment, one of the anode or cathode is part of or dissolved in a liquid such as water, carbonated water, mineral water, soda, fruit juice, etc. that can be stored in the anode storage compartment 510 or the cathode storage compartment 520.

The anode storage compartment 510 and the cathode storage compartment 520 can be operably connected to a mixing assembly such as a manifold 540. An actuator, not illustrated, can release a portion of the contents of the anode storage compartment 510 and the cathode storage compartment 520 into the manifold 540. The actuator can be a hand pump, a squeeze bottle, a button such as a fountain soda dispenser button, etc. In one embodiment, the manifold 540 mixes the encapsulated anodes and the encapsulated cathodes together. The encapsulated components can rupture, such as due to a change in pressure or from the mixing, to form an active battery. If the encapsulated components are mixed with an acidic liquid, the acid can dissolve the membranes and cause the encapsulated components to rupture. In another embodiment, the manifold 540 can include protrusions, blades, etc. that cause any encapsulated components to rupture. Rupturing the encapsulated battery components allows the battery components to form a battery. The mixed battery components, along with any liquids stored in the storage compartments are mixed and exit the manifold 540. The resulting liquid 550 exiting the manifold 540 contains an active battery. In another embodiment, all or a portion of encapsulated battery components are ruptured by maceration or are dissolved internally in a stomach or intestines due to gastric liquids.

In one embodiment, the anode storage compartment 510, cathode storage compartment 520, and the manifold 540 can be placed in an enclosure 560, such as, but not limited to, a soda fountain, an aluminum can, plastic bottle, condiment dispenser, squeeze tubes, field rations, dispenser, etc. In an illustrative embodiment, the enclosure 560 includes a beverage dispenser. In one embodiment, encapsulated anodes can be stored in the anode storage compartment 510. The cathode compartment 520 can store a liquid such as, but not limited to, concentrated beverage syrup, fruit juice, etc., along with a cathode. In one embodiment, the cathode is dissolved in the liquid. An electrolyte can be encapsulated and stored in the anode storage compartment 510. The liquid can also act as an electrolyte. The manifold 540 can be in fluid communication with the anode storage compartment 510 and the cathode compartment 520. A portion of the encapsulated anodes and a portion of the liquid can be released into the manifold 540. The encapsulated anodes and encapsulated electrolyte, if present, can rupture due to a change in pressure, dissolving, maceration, the manifold, etc. Once ruptured, the anode, cathode, and electrolyte can form a battery in the liquid, and the liquid can be dispensed from the manifold.

Figure 6:
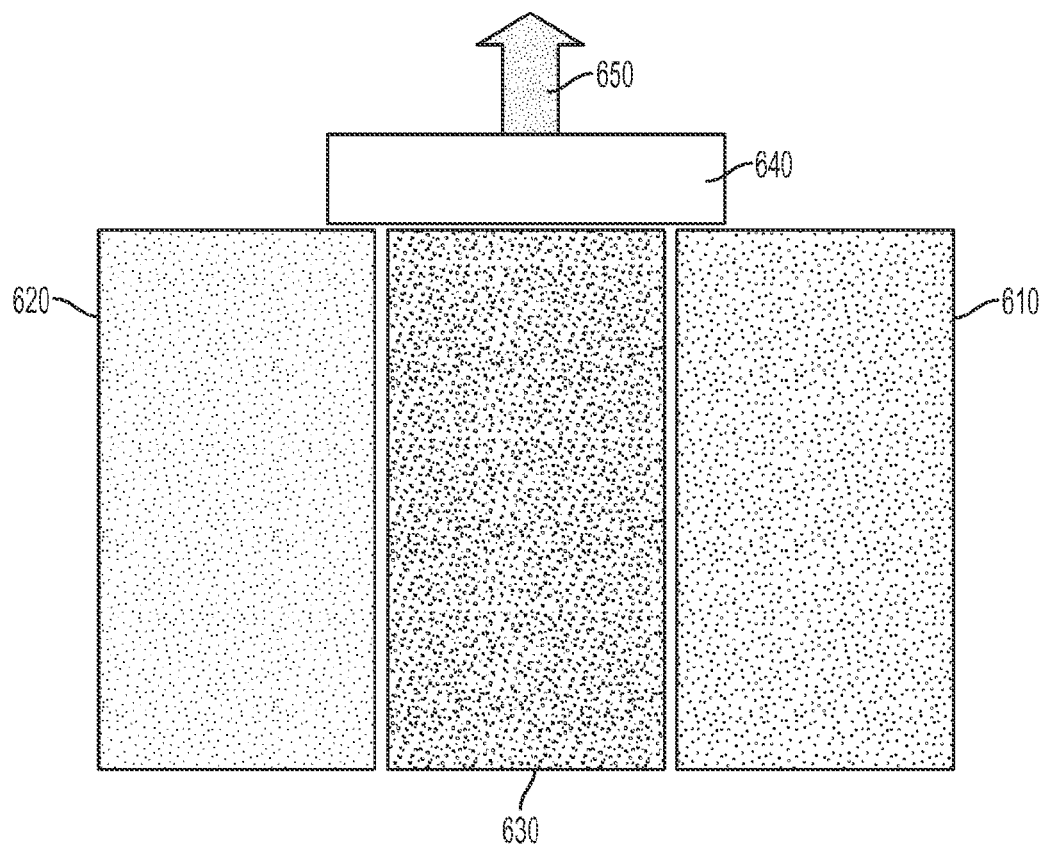
FIG. 6 illustrates three battery storage compartments in accordance with an illustrative embodiment.

Encapsulated battery components can be stored in various other configurations of storage compartments. FIG. 6 illustrates three battery storage compartments in accordance with an illustrative embodiment. In this illustrated embodiment, components can be stored in an anode storage compartment 610, a cathode storage compartment 620, and a beverage storage compartment 630. The contents of one or more of these components can be stored under pressure. The beverage storage compartment 630 can store a beverage, such as, but not limited to, water, carbonated water, fruit juice, soda, etc. In another embodiment, the beverage storage compartment 630 can store a component of a beverage, such as, but not limited to a concentrated syrup, water, carbonated water, mineral water, etc. In some embodiments, the beverage or beverage component can act as an electrolyte for a battery formed from anodes and cathodes stored in the anode storage compartment 610 and the cathode storage compartment 620, respectively.

In one embodiment, encapsulated anodes can be stored in the anode storage compartment 610. In another embodiment, the anode storage compartment 610 can also include a liquid such as, but not limited to, water, carbonated water, mineral water, etc. The liquid and/or the encapsulated anodes can include an electrolyte. In yet another embodiment, the anode storage compartment 610 can store an unencapsulated anode with or without another liquid, such as, but not limited to, water, carbonated water, a beverage component, etc. The cathode storage compartment 620 can include encapsulated cathodes. In one embodiment, the cathode storage compartment 620 can also include a liquid such as, but not limited to, water, carbonated water, mineral water, etc. The liquid and/or the encapsulated cathodes can include an electrolyte. In yet another embodiment, the cathode storage compartment 620 can store an unencapsulated cathode with or without another liquid, such as, but not limited to, water, carbonated water, a beverage component, etc.

In another embodiment, an encapsulated electrolyte can be stored in the anode storage 610 compartment, the cathode storage compartment 620, and/or the beverage storage compartment 630. In yet another embodiment, either the anode or the cathode is not encapsulated.

The anode storage compartment 610, the cathode storage compartment 620, and the beverage storage compartment 630 can be operably connected to a mixing assembly such as a manifold 640. An actuator, not illustrated, can release a portion of the contents of the anode storage compartment 610, the cathode storage compartment 620, and the beverage storage compartment 630 into the manifold 640. The actuator can be a hand pump, a squeeze bottle, a button, or similar dispenser that can be used to dispense a portion of the contents of the compartments. In one embodiment, the manifold 640 mixes the anode, cathode, and beverage components together. The encapsulated components can rupture, such as due to a change in pressure, due to the mixing, due to dissolving of the membrane, etc. to form an active battery. In one embodiment in which the beverage or beverage component is acidic, the beverage or beverage component can dissolve the membranes of encapsulated components. Dissolving the membrane of the encapsulated components releases the encapsulated components. In another embodiment, the manifold 640 can cause any encapsulated components to rupture. Rupturing the encapsulated battery components allows the battery components, which may include un-encapsulated components, to form a battery. The battery components, along with any liquids stored in the storage compartments are mixed or combined together and exit the manifold 640. The resulting liquid 650 exiting the manifold 640 contains an active battery. In another embodiment, all or a portion of encapsulated battery components are ruptured by maceration or are dissolved internally in a stomach or intestines due to gastric liquids.

Figure 7:
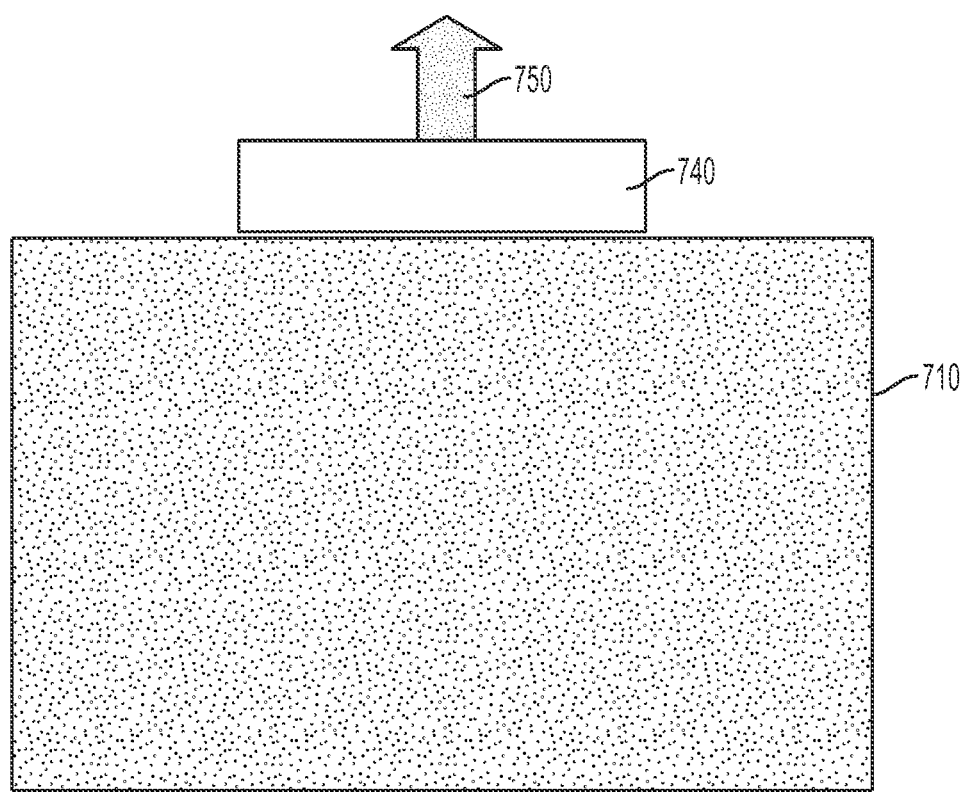
FIG. 7 illustrates a single battery storage compartment in accordance with an illustrative embodiment.

The various battery components can also be stored in a single storage compartment. FIG. 7 illustrates a single battery storage compartment in accordance with an illustrative embodiment. A single storage compartment 710 can store all of the battery components, some of which can be encapsulated. In one embodiment, all of the battery components can be encapsulated. In other embodiment, one or more of the battery components can be encapsulated and one or more of the battery components can be unencapsulated. For example, both the anode and cathode can be encapsulated while the electrolyte is unencapsulated. In one embodiment, the single storage compartment 710 can also include an encapsulated beverage, such as but not limited to, water, soda, fruit juice, etc. In another embodiment, the single storage compartment 710 can include an unencapsulated beverage.

The single storage compartment 710 can be operably connected to a mixing assembly such as a manifold 740. An actuator, not illustrated, can release a portion of the contents of the single storage compartment 710 into the manifold 740. The manifold can be a pump, a squeeze bottle, a button, or similar dispenser that can be used to dispense a portion of the contents of the single storage compartment 710. Upon being released from the single storage compartment 710, the encapsulated components can rupture, such as due to a change in pressure, etc. to form an active battery. In another embodiment, the manifold 740 can cause any encapsulated components to rupture. Rupturing the encapsulated battery components allows the battery components, which can include unencapsulated components, to form a battery. The battery components, along with any liquids stored in the single storage compartment 710 are mixed or combined together and exit the manifold 740. The resulting liquid 750 exiting the manifold 740 contains an active battery. In another embodiment, all or a portion of encapsulated battery components are ruptured by maceration or are dissolved internally in a stomach or intestines due to gastric liquids.

Figure 8:
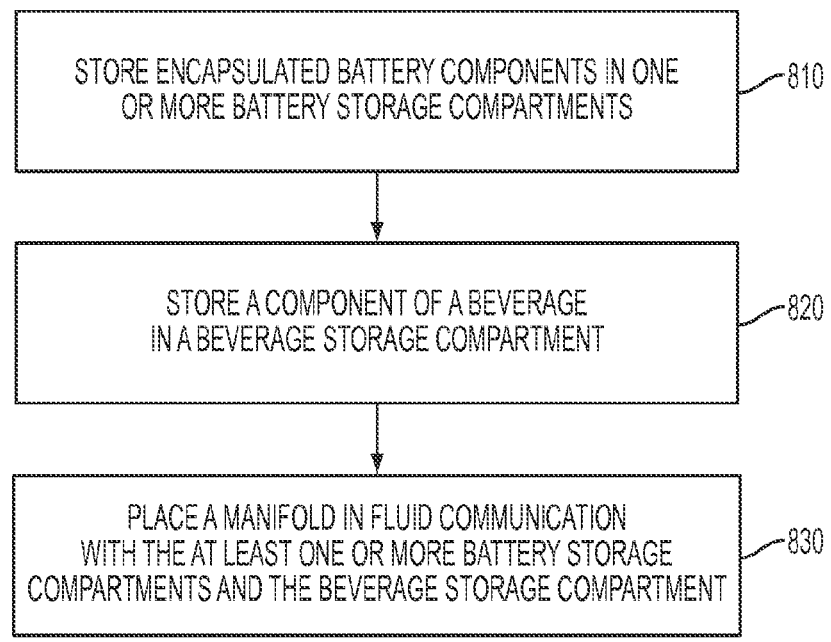
FIG. 8 is a flow diagram depicting operations performed in storing encapsulated anodes and cathodes in one or more storage compartments in accordance with an illustrative embodiment.

FIG. 8 is a flow diagram depicting operations performed in storing encapsulated anodes and cathodes in one or more storage compartments in accordance with an illustrative embodiment. In an operation 810, one or more encapsulated anodes and one or more encapsulated cathodes can be stored in one or more battery storage compartments. In one embodiment, encapsulated anodes are stored in a first battery storage compartment and the encapsulated cathodes are stored in a second battery storage compartment. In another embodiment, operation 810 includes storing one or more encapsulated battery components and one or more unencapsulated battery components in at least one battery storage compartment. The unencapsulated battery components can be stored in a battery storage compartment along with the encapsulated battery components or in a separate battery storage compartment. In an operation 820, a component of a beverage can be stored in a beverage storage compartment. The beverage component can be encapsulated, unencapsulated, or a combination of the two. A manifold is placed in fluid communication with the one or more battery storage compartments and the beverage storage compartment in an operation 830. The manifold can receive and dispense at least a portion of the battery components and at least a portion of the beverage component. The manifold can also rupture any encapsulated components. The ruptured battery components along with any unencapsulated battery components can form a battery.

The current created by a battery can be used in numerous ways. In one example, the current of a battery can be used to affect delivery/absorption of a drug, to combat bacteria such as the bacteria, etc. In addition, the current can also have an anti-bacterial effect and/or an anti-viral effect. In another embodiment, the anode, the electrolyte, or the cathode can include an antibacterial agent. In an illustrative embodiment, a battery can be formed in a mouthwash. The current created by this battery can have an anti-viral effect and can be used in the treatment of sores of the mouth, such as, but not limited to, canker sores. In another embodiment, the current from a battery can be used to treat various skin conditions. In one illustrative embodiment, a battery can be applied to a rash, an area of dry skin, and/or an area of irritated skin, for instance, using a lotion that contains encapsulated battery components. The battery can generate a current that flows through portions of the skin, which can be used to diminish itching in skin by providing a competing stimulus.

In another illustrative embodiment, a battery can be included in various liquids or components such as, but not limited to, mouthwashes, shampoos, hair dyes, beverages, medicines, energy drinks, cleaners, eye drops, tooth pastes, shampoos, facial masks, etc. In each of these embodiments, a battery can provide an electrical current that enhances the performance of the liquid or component for its intended purpose. For instance, the electrical current may facilitate the delivery of a drug contained within a liquid medicine. In another embodiment, the current from the battery may impede the flora of the mouth, and therefore, helps protect against bad breath, cavities, and/or gum disease. In addition, the battery may also increase the production and secretion of saliva, which also helps protect against cavities and/or gum disease. In another embodiment, battery components are incorporated into toothpaste that can include flavoring, such as, but not limited to, mint, bubble gum, berry, etc.

In another embodiment, a pill can be used to store one or more encapsulated battery components. The pill can include a single chamber that includes the encapsulated battery components, any unencapsulated battery components, and any other component, such as a medicine, drug, vitamin, etc. A coating can surround the pill and encapsulate the chamber. The coating can be made of, but not limited to, e.g., gelatin, wax, hypromellose, methyl cellulose, hydroxypropyl cellulose, etc. In one embodiment, the pill can be swallowed by a subject and the coating can dissolve during digestion. Eventually, the encapsulated battery components can be released from the pill and come into contact with one another to create a battery. In another embodiment, the pill can be chewed, which can rupture the encapsulated battery components. In one embodiment, the pill can also include a drug or vitamin, whose delivery is affected by the current generated by the battery. In another embodiment, one or more pills can be integrated into a component, such as, but not limited to, a preserve, a cheese product, a shampoo, or a cleaning agent. Pressure applied to the component, such as through spreading the component or massaging the component, can cause the encapsulated components to rupture to create a battery.

In another embodiment, the battery components can be made of cosmetic grade materials, such as, but not limited to, aluminum and carbon. One or more of these battery components may be encapsulated. In one embodiment, a battery formed from encapsulated components, can be used as an antiperspirant and/or deodorant. For example, a liquid antiperspirant can include an anode, for example, an aluminum complex, an electrolyte, and encapsulated cathodes can be formed from carbon. Illustrative aluminum complexes include, but are not limited to, aluminum chloride, aluminum chlorohydrate, and aluminum-zirconium compounds. Prior to being applied, during the application, or at sometime after the application, the encapsulated battery components can rupture to form a battery with the other battery components. Current produced by the battery through or over a subject's skin can aid in the iontophoretic delivery of the aluminum-based complexes. Although not intending to be limited by theory, the aluminum-based complexes may aid in the formation of plugs in sweat glands, and thus, can help prevent perspiration. The aluminum-based complexes may also interact with keratin fibrils in sweat ducts and form a physical plug that prevents sweat from reaching the surface of skin. Accordingly, a battery can be used to combat excessive sweating in an area of skin that is covered by the battery. One or more of the battery components can also include fragrant materials.

In another illustrative embodiment, a battery can be used to treat wounds or burns. The battery can be applied to an affected portion of a subject's skin, for example, by using a lotion, to provide a current through the subject's skin tissue. The current can be used to affect the healing of the wound through, but not limited to, increasing blood flow, enhancing tissue oxygenation, preventing an infection, stimulating epidermal cell reproduction, etc. In some embodiments, the electrical current can reduce the amount of scar tissue of a healed wound, resulting in a smoother and thinner scar.

Another illustrative embodiment includes a hair dye that includes or is combined with the battery components to form a battery. As the hair dye is applied, the battery can create an electrical current that flows through a subject's scalp, tissue, and/or hair. This electrical current can enhance the application of the hair dye, for example by reducing the application time and/or by increasing the absorption of the hair dye into hair. In another illustrative embodiment, a cleaner includes the battery components. Current from the battery can help loosen dirt, grease, and/or enhance the cleaning ability of the cleaner.

A number of parameters may influence the properties of a battery. For example, the terminal voltage of the battery, the amperage of the circuit 400 (FIG. 4), and the lifespan of the battery may be configured based upon the properties of the battery and the battery components. The materials that make up the battery components provide properties that can affect the voltage of the battery. In one embodiment, the amperage of the circuit 400 can be increased by increasing the molar concentration of the electrolyte in a liquid that includes the cathode and anode. The concentration of the anode and cathode also impacts the longevity of the battery. For example, higher concentrations of the anode and/or the cathode within a dispersed liquid generally results in a longer lasting battery. The life of the battery can also be increased by using encapsulated battery components that include membranes of varying thickness. As a non-limiting example, encapsulated anodes can include encapsulated anodes that have a membrane thickness of 0.010 inches and encapsulated anodes that have a thinner membrane thickness of 0.005 inches. Varying the thickness of the encapsulated components can result in the rupturing of the battery components at varying times. This allows the encapsulated battery components to be replenished, which can result in keeping the battery active for longer periods of time compared to a battery that only includes encapsulated battery components of a nearly uniform thickness.

EXAMPLES

The present compositions and methods will be understood more readily by reference to the following examples, which are provided by way of illustration and are not intended to be limiting in any way.

Example 1

Beverage

A battery can be incorporated into a beverage. Encapsulated anodes and encapsulated cathodes can be stored in a single battery storage compartment or separate battery storage compartments. A beverage storage compartment can include a beverage such as, but not limited to, soda, fruit juice, water, mineral water, carbonated water, etc. A manifold can be in fluid communication with the battery storage compartment or compartments and the beverage storage compartment. A portion of the encapsulated anodes, encapsulated cathodes, and beverage can be dispensed from the respective storage compartment and enter the manifold. The encapsulated anodes and cathodes can then rupture due to a change in pressure, due to maceration, due to the manifold, by being dissolved, etc. Once ruptured, the anode, cathode, and an electrolyte can form a battery. In one embodiment, the beverage can provide the electrolyte.

Example 2

Beverage Dispenser

A beverage dispenser can deliver a battery. In one embodiment, encapsulated anodes are stored in an anode storage compartment. A second compartment can store a liquid such as, but not limited to, concentrated beverage syrup, fruit juice, etc., along with a cathode. In one embodiment, the cathode is dissolved in the liquid. An electrolyte can be encapsulated and stored in the anode storage compartment. The liquid can also act as an electrolyte. A manifold can be in fluid communication with the anode storage compartment and the second compartment. A portion of the encapsulated anodes and a portion of the liquid can be released into the manifold. The encapsulated anodes and encapsulated electrolyte, if present, can rupture due to a change in pressure, dissolving, maceration, the manifold, etc. Once ruptured, the anode, cathode, and an electrolyte can form a battery in the liquid, and the liquid can be dispensed from the manifold.

Example 3

Liquid Soap

A battery can be incorporated into a liquid soap. A single compartment can include encapsulated anodes and encapsulated cathodes. The compartment can also include a liquid soap. The liquid soap can include an electrolyte. A pump nozzle can be in fluid communication with the compartment. The pump nozzle can dispense an amount of the liquid soap when engaged. The encapsulated anode and encapsulated cathode can be ruptured when dispensed through the nozzle. For example, the nozzle can include internal protrusions, a screen, a blade, etc., that ruptures the encapsulated components prior to being dispensed from the nozzle. Once dispensed, the liquid soap contains a battery. The battery can generate a current that can be felt, for example, by a user while lathering their hands. The current can be configured to increase the effectiveness of the liquid soap, for example, by loosening dirt or by stimulating a user to wash more vigorously.

Example 4

Treatment of Dry Mouth

A battery incorporated into a beverage or mouthwash can also be used as a treatment of dry mouth. One or more encapsulated anodes and cathodes can be released from a battery storage compartment. A liquid can be released from another storage compartment or can also be stored along with the encapsulated battery components. The liquid and encapsulated battery components are mixed together resulting in the rupturing of at least some of the encapsulated battery components. The ruptured battery components, along with any unencapsulated battery components, form a battery. The battery can be administered orally to increase saliva production and secretion levels compared to the levels prior to the creation and administration of the battery. The battery, therefore, will be useful in treating dry mouth. The battery may be incorporated into various liquids, such as, but not limited to, a mouthwash, a beverage, a liquid medicine, etc.

Example 5

Cleaner

A battery can also be integrated into a cleaner. For example, a cleaner can include encapsulated anodes and encapsulated cathodes. The cleaner can include an electrolyte. The cleaner can be stored in a storage compartment. A manifold can be in fluid communication with the storage compartment and a pump nozzle. The pump nozzle can dispense an amount of the cleaner when engaged. The encapsulated anode and encapsulated cathode can be ruptured when dispensed through the nozzle. For example, the nozzle can include internal protrusions, a screen, a blade, etc., that ruptures the encapsulated components prior to being dispensed from the nozzle. Once dispensed, the cleaner contains a battery. Electrical current generated by the battery can flow through or on the surface of a material that is to be cleaned to enhance the cleaner. For example, the current can help loosen dirt, grease, etc.

Example 6

Antiperspirant

Encapsulated anode can include cosmetic grade aluminum and encapsulated cathodes can include cosmetic grade carbon. Either the anodes or the cathodes can include sodium chloride that acts as an electrolyte. The encapsulated anodes and cathodes can be stored in a single storage compartment, which can be an antiperspirant container. The antiperspirant container can include an applicator, such as a roll on applicator, that ruptures the encapsulated anodes and encapsulated cathodes and releases an antiperspirant and/or deodorant that contains a battery. The battery results in current flowing through the underarm and results in a reduction in the amount of sweat produced by a subject compared to the amount of sweat produced prior to the application of the battery. The aluminum-based complexes may aid in the formation of plugs in sweat glands, and thus, can help prevent perspiration. The aluminum-based complexes may also interact with keratin fibrils in sweat ducts and form a physical plug that prevents sweat from reaching the surface of skin.

Example 7

Lotion

A lotion includes encapsulated anodes and encapsulated cathodes. A collapsible tube includes the lotion, a single storage compartment, and a manifold dispensing nozzle. In one embodiment, the manifold dispensing nozzle is created using three dimensional printing. The manifold can rupture the encapsulated battery components and/or applying the lotion can rupture the encapsulated battery components. The lotion can be applied to an area of a subject's skin, e.g., under or around the eye or mouth, hands, arms, stomach, etc. Upon rupturing, a battery can be formed and an electrical current can flow through or over a subject's skin. In one embodiment, the electrical current generated by the battery can cause the subject's muscles local to the placement of the lotion to be stimulated.

Example 8

Shampoo

A dispenser can include an anode storage compartment that stores encapsulated anodes and a cathode storage compartment that stores encapsulated cathodes. The encapsulated anodes and/or the encapsulated cathodes can include an electrolyte. Additionally, a shampoo can be stored in the anode storage compartment and/or the cathode storage compartment. A manifold can be in fluid communication with the anode storage compartment and the cathode storage compartment. In one embodiment, the encapsulated battery components are ruptured by the manifold when the shampoo is dispensed. In another embodiment, the manifold does not rupture the encapsulated components. Instead, the encapsulated battery components are ruptured when the shampoo is used, for instance, when the shampoo is massaged into a subject's scalp. Once ruptured, the encapsulated components can form a battery. Electrical current from the battery flows through or over the subject's hair and scalp and can help the shampoo remove oil, dirt, dandruff, contaminants, etc from the subject's hair. Such stimulation will also have the beneficial effective of providing stimulation and a pleasant sensation to a subject's scalp and other body areas.

Example 9

Toothpaste

A battery can be formed from encapsulated battery components in conjunction with dispensing an amount of toothpaste. A dispenser contains a single storage chamber that includes one or more encapsulated battery components. The encapsulated battery components can be stored with toothpaste components, such as, but not limited to, abrasives, fluoride, detergents, whiteners, etc. A manifold in fluid communication with the single storage chamber can be used to dispense an amount of toothpaste. Upon being dispensed, the encapsulated components can be ruptured, for instance, by the manifold and/or by a subject brushing their teeth. Applying the toothpaste to a subject's mouth results in a current that flows through or over various portions of a subject's mouth, such as but not limited to, gums, teeth, tongue, etc. The electrical current can help the clean the subject's teeth, whiten the subject's teeth, combat against gum disease, freshen the subject's breath, etc.

As discussed above, a battery typically has a pair of electrodes, the negatively charged anode and the positively charged cathode, and an electrolyte. Sometimes a separator or resistive material may be also employed. Each of these, as well as other electrical components, is referred to as a battery component.

In accordance with some embodiments described herein the battery components are encapsulated. In some embodiments, each battery component is encapsulated separately from the others. In some embodiments, one or more battery component may be encapsulated with another component. In some such combined encapsulations, the battery components may be separate from each other. Some co-encapsulated embodiments, include an electrode (anode or cathode) encapsulated with an electrolyte. In such embodiments, the electrode and the electrolyte may be encapsulated together, or one may be encapsulated separately from the other, and the remaining encapsulated around the first. In some embodiments, both electrodes and an electrolyte may be encapsulated together. In such examples, one or both electrodes are encapsulated themselves to keep them separated.

Figure 9:
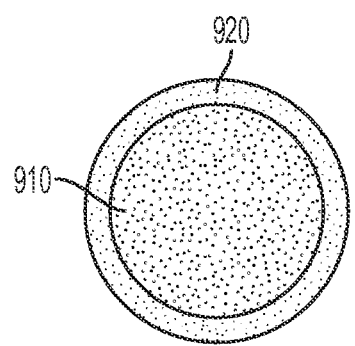
FIG. 9 is a cross-section of an encapsulated battery component in accordance with an illustrative embodiment.

In an embodiment, as shown in FIG. 9, an encapsulated battery component includes: a battery component [910] selected from an electrode (a cathode or an anode), an electrolyte, or any combination thereof; and an encapsulating material [920] which coats substantially the entirety of the battery component. In some embodiments, an encapsulated battery component may be non-toxic for an application to or ingestion by an animal such as a human.

Figure 10:
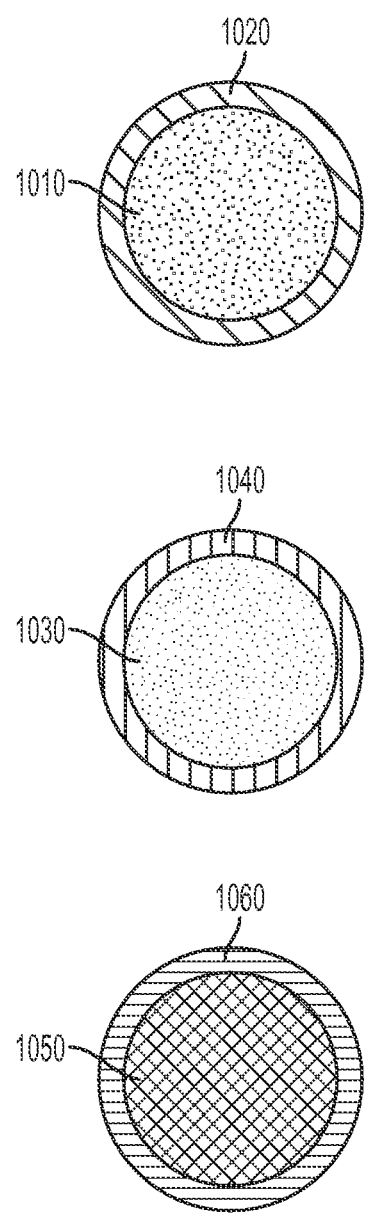
FIG. 10 is cross-section of encapsulated battery components in accordance with illustrative embodiments.

In an embodiment, as shown in FIG. 10, a battery includes: one or more encapsulated anodes comprising an anode material [1010] surrounded by an anodic membrane [1020]; one or more encapsulated cathodes comprising a cathode material [1030] surrounded by a cathodic membrane [1040]; and an electrolyte, wherein the one or more encapsulated anodes, the one or more encapsulated cathodes, and the electrolyte may be configured to generate an electrical current upon a breach of the anodic membrane and the cathodic membrane. In some embodiments, the anode material can be a liquid anode material, the cathode material can be a liquid cathode material, or both. In some embodiments, the electrolyte may be an encapsulated electrolyte comprising an electrolyte material [1050] surrounded by an electrolytic membrane [1060] and the electrolytic membrane may breach simultaneously with the anodic membrane and the cathodic membrane. As used herein, the terms "anodic membrane", "cathodic membrane", and "electrolytic membrane" are so named based on the material within the membrane. For example: the anodic membrane at least surrounds an anode material; the cathodic membrane at least surrounds a cathode material; and the electrolytic membrane at least surrounds an electrolyte material. The membrane itself need not have, and in some embodiments does not have, the same characteristic; that is a cathodic membrane, typically, is not positively charged. Thus, each battery component may include a battery component membrane surrounding a liquid battery component. In some embodiments, combinations are also possible, as described elsewhere herein, the naming convention described here aids in understanding. In some embodiments, a battery may be non-toxic for an application to or ingestion by an animal such as a human.

In some embodiments, a cathodic membrane may encapsulate one or more encapsulated anodes or an anodic membrane may encapsulate one or more of encapsulated cathodes.

Figure 11:
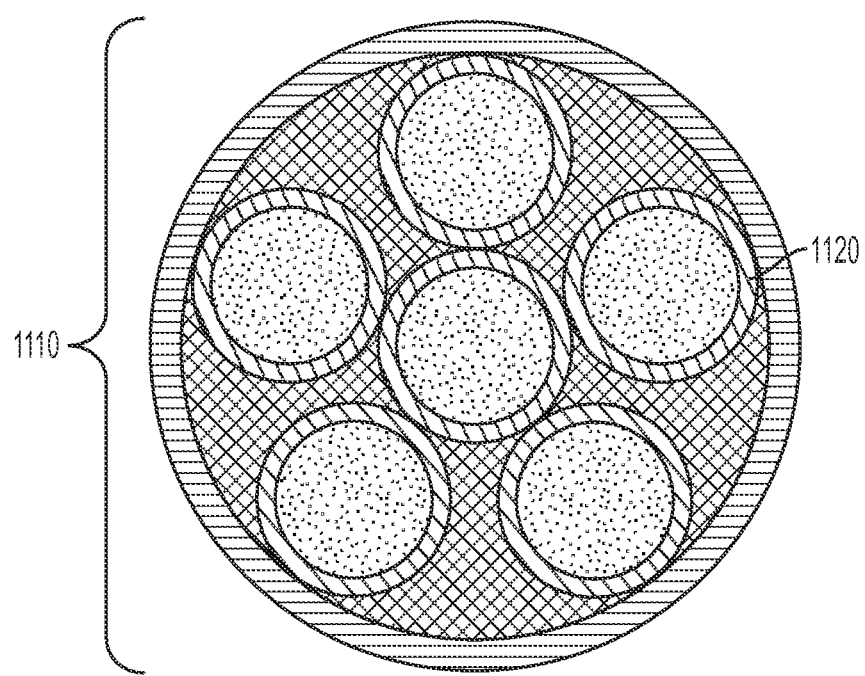
FIG. 11 is cross-sections of encapsulated battery components in accordance with illustrative embodiments.
Figure 11:
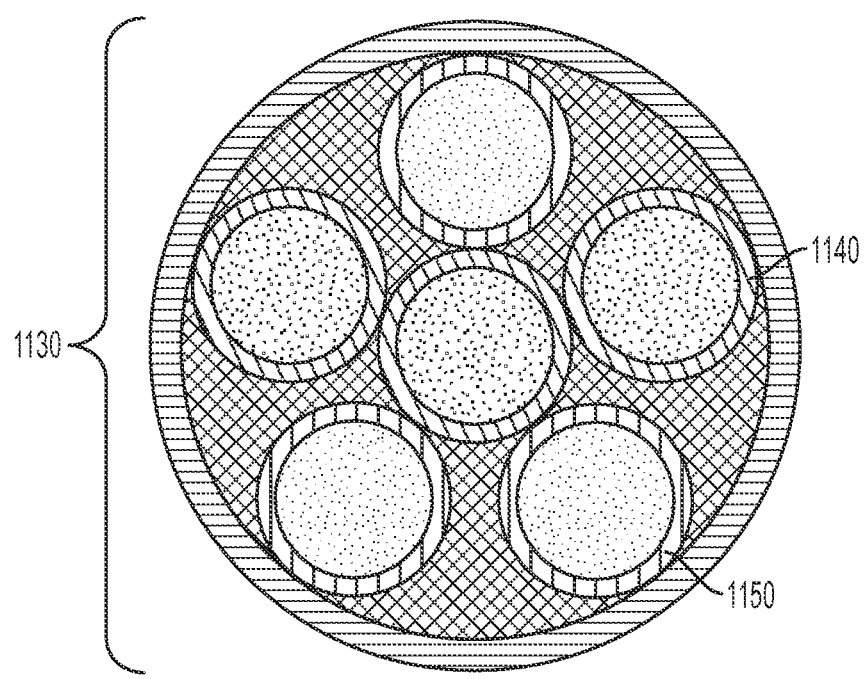

In some embodiments, as shown in FIG. 11, an electrolytic membrane may encapsulate [1110] one or more encapsulated anodes [1120]; may encapsulate one or more encapsulated cathodes; may encapsulate [1130] one or more of both encapsulated anodes and encapsulated cathodes [1150]; may be encapsulated by an anodic membrane; may be encapsulated by a cathodic membrane, or a combination thereof.

Figure 12:
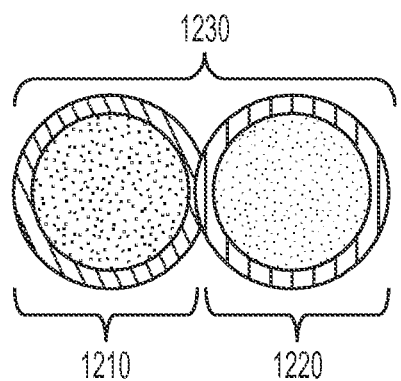
FIG. 12 is cross-sections of a diad and a triad in accordance with illustrative embodiments.
Figure 12:
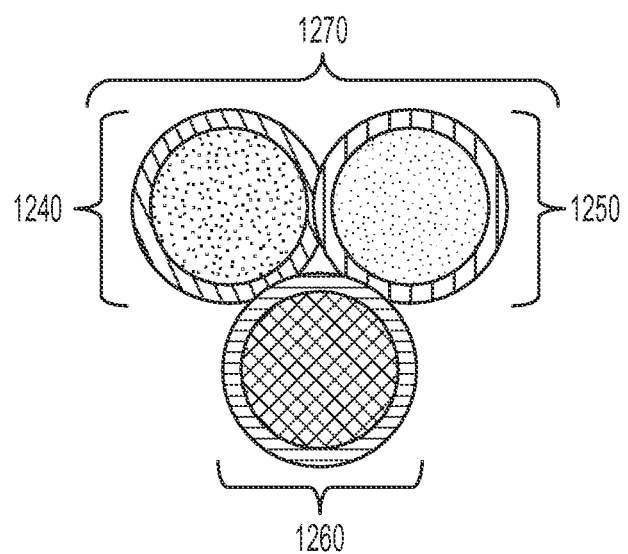

In some embodiments, two encapsulated battery components may be linked together and form a diad. As shown in FIG. 12, an encapsulated anode [1210] and an encapsulated cathode [1220] may form a linked diad [1230]. In other embodiments, three encapsulated battery components may be linked together and form a triad. For example an encapsulated anode [1240], an encapsulated cathode [1250], and an encapsulated electrolyte [1260] may form a linked triad [1270].

In some embodiments, the battery may be suitable for consumption by mammals, particularly humans. In some embodiments, the electrolyte may comprise one or more encapsulated electrolytes.

In some embodiments, the battery may be disposed in and activated by placement within a fluid. In some instances, such fluids may be, but are not limited to beverages, such as soda, syrup, fruit juice, water, mineral water, carbonated water, ethanol (alcoholic beverages), milk, tea, coffee, energy drinks, sports drinks, instant drinks, personal care products such as but not limited to shampoo, mouthwash, soap, deodorant, lubricant and any combination thereof. The battery may be used with any liquid or semi-liquid that comes into contact with a body surface that will facilitate an electron flow, such as but not limited to a mucosal membrane, wet skin, or combinations thereof. In some embodiments, the battery may be a beverage suitable for consumption by a mammal.

In some embodiments, the battery may be configured to produce an organoleptic effect when contacted with the oral cavity, particularly the tongue, gums, roof of the mouth, and cheeks. As use herein, the term "organoleptic" is defined as the capacity of a foodstuff to produce an effect on the senses (sight, touch, smell, taste, and hearing), so that it might be perceived, distinguished, and appreciated. In some embodiments, the battery may produce a current that yields the organoleptic effects. Because current (I) is proportional to voltage (E) and inverse to resistance (R), e.g. $I=E/R$, current may be controlled in embodiments by modifying the voltage of the battery, adjusting membrane thickness, or adding resistive materials such as carbon to the battery components. The organoleptic effect may differ from individual to individual, but generally provides a tingly feeling, not necessarily recognized as an electrical effect. In some embodiments, the battery components may be present in an amount that is adjustable to achieve a desired organoleptic effect. In some embodiments, the battery may be configured to deliver one or more nutrients when ingested. In some embodiments, the battery may be stored under pressure.

In some embodiments, the voltage of the battery may be modified by using different anode/cathode pairs. For example, a Zinc/Copper pair may have a voltage of about 1.10 V, a Magnesium/Carbon pair may have a voltage of about 1.20 V, a Nickel/Iron pair may have a voltage of about 1.20 V, a Zinc/Carbon pair may have a voltage of about 1.50 V, a Zinc/Manganese dioxide pair may have a voltage of about 1.50 V, and an Aluminum/Manganese dioxide pair may have a voltage of about 1.90 V.

In some embodiments, a battery component may be an electrode which may comprise a liquid electrode material. In some embodiments, the electrode may be an anode comprising a liquid anode material. A liquid anode material may comprise a food grade anode material including but not limited to zinc, nickel, aluminum, magnesium and any combination thereof. In some embodiments, the cathode maybe be elemental zinc. In other embodiments, the electrode may be a cathode comprising a liquid cathode material. A liquid cathode material may comprise a food grade cathode material including but not limited to copper gluconate, copper sulfate, copper, carbon, manganese dioxide, iron, and any combination thereof. In further embodiments, the battery component may be an electrolyte. In these embodiments, the electrolyte may comprise a liquid electrolyte material. A liquid electrolyte material may comprise a food grade electrolyte material including but not limited to phosphoric acid, ascorbic acid, citric acid, salt, and any combination thereof.

In embodiments, an encapsulating material may comprise at least one membrane configured to encapsulate the battery component. In some embodiments, the encapsulating material may be a polysaccharide. In some embodiments, the at least one membrane may comprise a cross-linked polysaccharide. In these embodiments, the cross-linked polysaccharide may be alginic acid, gellan, carrageenan, pectin, and combinations thereof. In some embodiments, the polysaccharide may be cross-linked with a divalent cation. In some embodiments, the divalent cation may be selected from the group comprising calcium, magnesium, and any combination thereof. In further embodiments, the at least one membrane may be coated with an additional layer comprising a polysaccharide, a protein, or chitosan. In some embodiments, an anodic membrane may comprise an encapsulating material. In some embodiments, a cathodic membrane may comprise an encapsulating material. In some embodiments, an electrolytic membrane may comprise an encapsulating material.

In some embodiments, encapsulated battery components (including encapsulated anodes, encapsulated cathodes, and encapsulated electrolytes) may be spheres. In some embodiments, the diameter of a sphere or the average diameter of spheres may be about 0.1 mm to about 5 mm.

In some embodiments, encapsulated battery components (including encapsulated anodes, encapsulated cathodes, and encapsulated electrolytes) may be configured to rupture, dissolve, excrete, or otherwise allow the liquid anode, cathode, or electrolyte material to breach the encapsulating material. As used herein, "rupture" describes a tear, rip, or fissure in the encapsulating material. As used herein, "dissolve" describes erosion of the encapsulating material. As used herein, "excrete" describes escape of the liquid anode, cathode, electrolyte material through an otherwise intact, or partially intact, encapsulating material. For example, an encapsulating material may provide pores through which material may escape.

In an embodiment, a method of making an encapsulated battery component includes: combining at least one battery component and a first membrane forming substance in a first liquid to form a first solution; combining a second membrane forming substance in a second liquid to form a second solution; and adding either a portion of the first solution to the second solution or a portion of the second solution to the first solution to form an encapsulated battery component, wherein the battery component may be an electrode, an electrolyte, or any combination thereof.

In some embodiments, the first membrane forming substance may comprise a cross-linkable polysaccharide or a salt thereof. In some embodiments, the cross-linkable polysaccharide may be alginic acid, gellan, carrageenan, pectin, and combinations thereof. In some embodiments, the second membrane forming substance may comprise a divalent cation or a salt thereof. In some embodiments, the divalent cation may be selected from the group includes calcium, magnesium, and any combination thereof.

In an embodiment, a composition includes: a carrier liquid; and a battery, wherein the battery may include: one or more encapsulated anodes comprising an anode material surrounded by an anodic membrane; one or more encapsulated cathodes comprising a cathode material surrounded by a cathodic membrane; and an electrolyte, wherein the one or more encapsulated anodes, the one or more encapsulated cathodes, and the electrolyte may be configured to generate an electrical current upon a breach of the encapsulation material within the carrier liquid. In some embodiments, the carrier liquid may be a beverage. In some embodiments, the carrier liquid may be a beverage selected from carbonated beverages, sweetened beverages, teas, coffees, juices, artificial juices, alcoholic beverages, milk, energy drinks and combinations thereof. In some embodiments, the composition may be non-toxic for an application to or ingestion by an animal such as a human.

In some embodiments, the ionic strength of a liquid may hinder the formation of encapsulated battery components, or may destabilize encapsulated battery components. In these embodiments, at least one sequestrate may be used. A sequestrate may counteract the negative effects of the ions by binding to them and preventing their interaction with the encapsulation process. In some embodiments, the sequestrate may be sodium hexametaphosphate. Hexametaphosphate may have little or no taste, and it may sequester ions even in acidic solutions. In some embodiments, the sequestrate may be sodium citrate, which may work well at pH levels above about 6.0 but may lose its sequestering ability below a pH of about 4.5. In some embodiments, this pH-specific behavior may be used to make a gel that sets only when it becomes acidic and causes the sodium citrate to release ions. In some embodiments, a sequestrate may allow the formation of encapsulated battery components at lower temperatures than would be otherwise achievable. In other embodiments, a sequestrate may allow the formation of encapsulated battery components at lower temperatures than would be otherwise achievable. For example, when making spheres using low pH fruit juices or alcohol, the use of a sequestrate will help facilitate proper sphere formation.

In an embodiment, a composition includes: a carrier liquid; and at least one battery component, wherein the battery component may be selected from: one or more encapsulated anodes comprising an anode material surrounded by an anodic membrane; one or more encapsulated cathodes comprising a cathode material surrounded by a cathodic membrane; an electrolyte; or any combination thereof. In some embodiments, the electrolyte may be an encapsulated electrolyte comprising an electrolyte material surrounded by an electrolytic membrane. In some embodiments, the carrier liquid may be a beverage. In some embodiments, the carrier liquid may be a beverage selected from carbonated beverages, sweetened beverages, teas, coffees, juices, artificial juices, alcoholic beverages, milk, energy drinks and combinations thereof. In some embodiments, the composition may be non-toxic for an application to or ingestion by an animal such as a human. In some embodiments, a beverage may comprise about 0.9 mg of the anode material and about 0.9 mg of the cathode material. In some embodiments, a beverage may comprise about 0.5 mg to about 1.5 mg of the anode material and about 0.5 mg to about 1.5 mg of the cathode material. In some embodiments, a beverage may comprise about 0.5 mg, about 0.7 mg about 0.9 mg about 1.1 mg about 1.3 mg, about 1.5 mg or any range of amounts or amounts between those listed (inclusive of end points) of the anode material. In some embodiments, a beverage may comprise about 0.5 mg, about 0.7 mg about 0.9 mg about 1.1 mg about 1.3 mg, about 1.5 mg or any range of amounts or amounts between those listed (inclusive of end points) of the cathode material.

In an embodiment, a kit includes: a carrier liquid; and a battery, wherein the battery may include: one or more encapsulated anodes comprising an anode material surrounded by an anodic membrane; one or more encapsulated cathodes comprising a cathode material surrounded by a cathodic membrane; an electrolyte, wherein the one or more encapsulated anodes, the one or more encapsulated cathodes, and the electrolyte may be configured to generate an electrical current upon a breach of the anodic membrane and the cathodic membrane within the carrier liquid; and a container for isolating the carrier liquid from the battery until desired. In some embodiments, the electrolyte may be an encapsulated electrolyte comprising an electrolyte material surrounded by an electrolytic membrane and the electrolytic membrane may breach simultaneously with the anodic membrane and the cathodic membrane. In some embodiments, the kit may be non-toxic for an application to or ingestion by an animal such as a human.

In an embodiment, a kit includes: battery components, wherein the battery components comprise one or more encapsulated anodes comprising an liquid anode material surrounded by an anodic membrane and one or more encapsulated cathodes comprising a liquid cathode material surrounded by a cathodic membrane; and a container for storing the battery components, wherein opening the container allows the battery components to be introduced to a carrier liquid and to generate an electrical current upon a breach of the anodic membrane and the cathodic membrane within the carrier liquid. In some embodiments, the battery components may further comprise an electrolyte. In these embodiments, the electrolyte may further comprise one or more encapsulated electrolytes comprising a liquid electrolyte material surrounded by an electrolytic membrane and the electrolytic membrane may be breached along with the anodic membrane and the cathodic membrane within the carrier liquid. In some embodiments, the carrier liquid may be a beverage. In some embodiments, the kit may further comprise a powder, liquid, or gel stored within the container and the powder, liquid, or gel may be introduced to the carrier liquid along with the battery components. In these embodiments, the powder, liquid, or gel may comprise a beverage mix, a beverage, or a concentrated beverage. In embodiments, a beverage may be selected from carbonated beverages, sweetened beverages, teas, coffees, juices, artificial juices, alcoholic beverages, milk, energy drinks and combinations thereof. In some embodiments, materials stored within the container of the kit may be non-toxic for an application to or ingestion by an animal such as a human It may be appreciated that the batteries and battery components as disclosed above may be combined with any number or type of possibly non-toxic carrier media to compose a consumable product for an animal. While types of consumable products are disclosed below with reference to consumption by humans, it is understood that these consumable products are not limited to humans, but may be, by extension, used by other animals.

Example 10

Sphere-Triad Formation

A cathode precursor mixture was formed by dissolving 2.0 grams of sodium alginate in 50.0 grams of deionized water, adding 50.0 grams of deionized water, dissolving 0.4 gram of xanthan gum, adding 50.0 grams of deionized water, dissolving 2.0 grams of copper gluconate, adding 100 grams of deionized water, filtering the mixture, degassing the mixture, and allowing the mixture to stabilize for 12 hours.

An anode precursor mixture was formed by dissolving 2.0 grams of sodium alginate in 50.0 grams of deionized water, adding 50.0 grams of deionized water, dissolving 0.4 gram of xanthan gum, adding 50.0 grams of deionized water, mixing in 2.06 grams of ultrafine grain zinc, adding 100 grams of deionized water, filtering the mixture, degassing the mixture, and allowing the mixture to stabilize for 12 hours.

An electrolyte precursor mixture was formed by dissolving 2.0 grams of sodium alginate in 50.0 grams of deionized water, adding 50.0 grams of deionized water, dissolving 0.4 gram of xanthan gum, adding 50.0 grams of deionized water, dissolving 10.0 of citric acid, adding 100 grams of deionized water, filtering the mixture, degassing the mixture, and allowing the mixture to stabilize for 12 hours.

Figure 13:
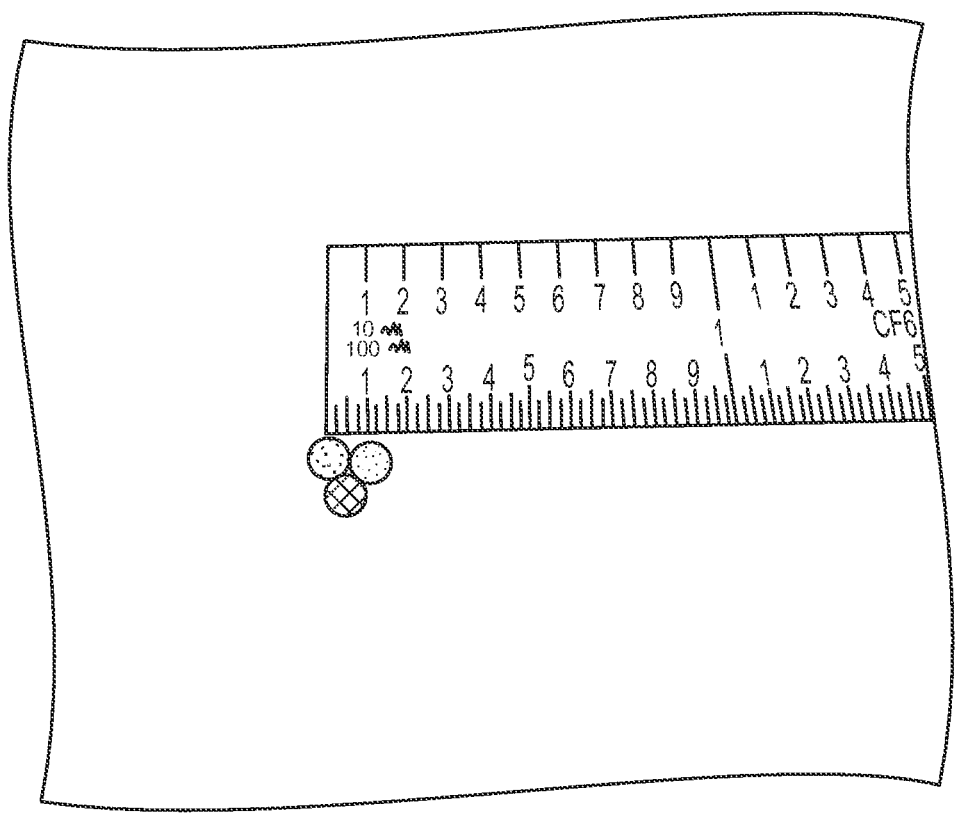
FIG. 13 is an illustration of a sphere triad in accordance with an illustrative embodiment.

Three hypodermic syringes were formed into a loosely attached triad. Syringe 1 was filled with the anode precursor mixture. Syringe 2 was filled with the cathode precursor mixture. Syringe 3 was filled with the electrolyte precursor mixture. The needles of the syringes were placed in a cold bath (about 3° C.) of filtered water and calcium lactate (about 1000 ppm) each of the precursor solutions were slowly introduced from the syringes to form spheres with a typical diameter of about 0.020 inches (0.51 mm) to about 0.050 inches (1.27 mm). Once the spheres were set (about 60 seconds), they were removed from the calcium lactate bath, washed in a bath of cold (about 3° C.) filtered water and placed to dry. FIG. 13 shows an exemplary triad, with dye added during the process to distinguish the anode, cathode and electrolyte, for illustrative purposes only.

Example 11

Carbonated Beverages

Several carbonated beverages, such as commercially available sodas (cola, lemon-lime), tonic, and seltzer water have been dosed with the battery components described herein and achieved an organoleptic effect. It is also contemplated that other carbonated beverages, such as orange sodas, grape sodas, strawberry sodas, fruit punch-flavored sodas, citrus sodas, Italian sodas, sparkling wines, Champagnes, and beers may also be similarly dosed. The exact dosing may be altered based upon the base liquid and the desired organoleptic effect.

Example 12

Cola

Sphere-triads were formed similar to Example 10, using cola in place of the water (to minimize any dilution effect on flavor). A single serving of a commercially available cola (8 fl. oz., 236.59 mL) was dosed with a 0.9 mL portion of the sphere triads. The dosed cola was consumed immediately, allowing the liquid to reside in the mouth for an extended period. A tingling organoleptic sensation was observed.

Example 13

Lemon-Lime Soda

Sphere-triads were formed similar to Example 10, using lemon-lime soda in place of the water. A single serving of a commercially available lemon-lime soda (8 fl. oz., 236.59 mL) was dosed with a 0.9 mL portion of the sphere triads. The lemon-lime soda was consumed immediately, allowing the liquid to reside in the mouth for an extended period. A tingling organoleptic sensation was observed.

Similar dosing and effect can be achieved in other carbonated beverages, including sodas, root beer, lemon-lime, orange soda, grape soda, tonic water, seltzer, soda water, etc.

Example 14

Energy Drinks

Several commercially available energy drinks have been dosed with the battery components described herein and achieved an organoleptic effect. It is also contemplated that other energy drinks may also be similarly dosed. The exact dosing may be altered based upon the base liquid and the desired organoleptic effect.

Example 15

Energy Drink

Sphere-triads were formed similar to Example 10, using a commercially available energy drink in place of the water. A single serving of the energy drink was dosed with a 0.9 mL portion of the sphere triads. The dosed energy drink was consumed immediately, allowing the liquid to reside in the mouth for an extended period. A tingling organoleptic sensation was observed.

Example 16

Waters

Several different types of water, such as bottled water, salt water, and flavored water have been dosed with the battery components described herein and achieved an organoleptic effect. It is also contemplated that other types of water may also be similarly dosed. The exact dosing may be altered based upon the base liquid and the desired organoleptic effect.

Example 17

Bottled Water

Battery components were introduced to a commercially available bottled water. A single serving of the water was dosed with a 0.9 mL portion of the sphere triads from Example 10. The dosed water was consumed immediately, allowing the liquid to reside in the mouth for an extended period. A tingling organoleptic sensation was observed.

Example 18

Mint Flavored Water

Battery components were introduced to a commercially available mint flavored water. A single serving of the water was dosed with a 0.9 mL portion of the sphere triads from Example 10. The dosed water was consumed immediately, allowing the liquid to reside in the mouth for an extended period. A tingling organoleptic sensation was observed.

Example 19

Salt Water

Sphere-triads were formed similar to Example 10, using salt water in place of the water and swapping the use of sodium alginate and calcium lactate such that a reverse spherification process was used. A single serving of the water was dosed with a 0.9 mL portion of the sphere triads. The dosed water was consumed immediately, allowing the liquid to reside in the mouth for an extended period. A tingling organoleptic sensation was observed.

Example 20

Fruit Juices

Several different types of fruit juices, such as orange juice, lemon juice (e.g., lemonade), grapefruit juice, mango juice, tomato juice, and pineapple juice have been dosed with the battery components described herein and achieved an organoleptic effect. It is also contemplated that other fruit juices may also be similarly dosed. The exact dosing may be altered based upon the base liquid and the desired organoleptic effect.

Example 21

Orange Juice

Sphere-triads were formed similar to Example 10, using orange juice in place of the water. A single serving of the juice was dosed with a 0.9 mL portion of the sphere triads. The dosed juice was consumed immediately, allowing the liquid to reside in the mouth for an extended period. A tingling organoleptic sensation was observed.

Example 22

Lemonade

Sphere-triads were formed similar to Example 10, using lemonade in place of the water. A single serving of the lemonade was dosed with a 0.9 mL portion of the sphere triads. The dosed lemonade was consumed immediately, allowing the liquid to reside in the mouth for an extended period. A tingling organoleptic sensation was observed.

Example 23

Grapefruit Juice

Sphere-triads were formed similar to Example 10, using grapefruit juice in place of the water. A single serving of the juice was dosed with a 0.9 mL portion of the sphere triads. The dosed juice was consumed immediately, allowing the liquid to reside in the mouth for an extended period. A tingling organoleptic sensation was observed.

Example 24

Mango Juice

Sphere-triads were formed similar to Example 10, using mango juice in place of the water. A single serving of the juice was dosed with a 0.9 mL portion of the sphere triads. The dosed juice was consumed immediately, allowing the liquid to reside in the mouth for an extended period. A tingling organoleptic sensation was observed.

Example 25

Tomato Juice

Sphere-triads were formed similar to Example 10, using tomato juice in place of the water. A single serving of the juice was dosed with a 0.9 mL portion of the sphere triads. The dosed juice was consumed immediately, allowing the liquid to reside in the mouth for an extended period. A tingling organoleptic sensation was observed.

Example 26

Pineapple Juice

Sphere-triads were formed similar to Example 10, using pineapple juice in place of the water. A single serving of the juice was dosed with a 0.9 mL portion of the sphere triads. The dosed juice was consumed immediately, allowing the liquid to reside in the mouth for an extended period. A tingling organoleptic sensation was observed.

Example 27

Caffeinated Beverages

Several different types of caffeinated beverages, such coffee and tea have been dosed with the battery components described herein and achieved an organoleptic effect. It is also contemplated that other caffeinated beverages may also be similarly dosed. The exact dosing may be altered based upon the base liquid and the desired organoleptic effect.

Example 28

Coffee

Battery components were introduced to coffee. A single serving of the coffee was dosed with a 0.9 mL portion of the sphere triads from Example 10. The dosed coffee was consumed immediately, allowing the liquid to reside in the mouth for an extended period. A tingling organoleptic sensation was observed.

Example 29

Tea

Battery components were introduced to tea. A single serving of the tea was dosed with a 0.9 mL portion of the sphere triads from Example 10. The dosed tea was consumed immediately, allowing the liquid to reside in the mouth for an extended period. A tingling organoleptic sensation was observed.

Example 30

Wines

Several different types of wine have been dosed with the battery components described herein and achieved an organoleptic effect. It is also contemplated that other wines may also be similarly dosed. The exact dosing may be altered based upon the base liquid and the desired organoleptic effect.

Example 31

Red Wine

Sphere-triads were formed similar to Example 10, using red wine in place of the water. A single serving of the wine was dosed with a 0.9 mL portion of the sphere triads. The dosed wine was consumed immediately, allowing the liquid to reside in the mouth for an extended period. A tingling organoleptic sensation was observed.

Example 32

White Wine

Sphere-triads were formed similar to Example 10, using white wine in place of the water. A single serving of the wine was dosed with a 0.9 mL portion of the sphere triads. The dosed wine was consumed immediately, allowing the liquid to reside in the mouth for an extended period. A tingling organoleptic sensation was observed.

Example 33

Mixed Alcohol Drinks

Several different types of mixed alcohol drinks, such as a gin and tonic and a vodka martini have been dosed with the battery components described herein and achieved an organoleptic effect. It is also contemplated that other mixed alcohol drinks may also be similarly dosed. The exact dosing may be altered based upon the base liquid and the desired organoleptic effect.

Example 34

Gin and Tonic

Sphere-triads were formed similar to Example 10, using tonic in place of the water. A single serving of a gin and tonic was dosed with a 0.9 mL portion of the sphere triads. The dosed drink was consumed immediately, allowing the liquid to reside in the mouth for an extended period. A tingling organoleptic sensation was observed.

Example 35

Vodka Martini

Battery components were introduced to a vodka martini. A single serving of the vodka martini was dosed with a 0.9 mL portion of the sphere triads from Example 10. The vodka martini was consumed immediately, allowing the liquid to reside in the mouth for an extended period. A tingling organoleptic sensation was observed.

Example 36

Mixed Non-Alcoholic Drinks

Several different types of mixed non-alcoholic drinks, such as a Shirley Temple (ginger ale, orange juice, and grenadine), have been dosed with the battery components described herein and achieved an organoleptic effect. It is also contemplated that other mixed alcohol drinks may also be similarly dosed. The exact dosing may be altered based upon the base liquid and the desired organoleptic effect.

Example 37

Shirley Temple

Ginger Ale, Orange Juice, and Grenadine

Sphere-triads were formed similar to Example 10, using Shirley Temple (ginger ale, orange juice, and grenadine) in place of the water. A single serving of the mixed drink was dosed with a 0.9 mL portion of the sphere triads from Example 10. The dosed drink was consumed immediately, allowing the liquid to reside in the mouth for an extended period. A tingling organoleptic sensation is observed.

Example 38

Mouthwash

Several different types of mouthwashes have been dosed with the battery components described herein and achieved an organoleptic effect. It is also contemplated that other mouthwashes may also be similarly dosed. The exact dosing may be altered based upon the base liquid and the desired organoleptic effect.

Example 39

Mouthwash

Sphere-triads were formed similar to Example 10, using a commercially available mouthwash in place of the water. A portion of the mouthwash is dosed with a 0.9 mL portion of the sphere triads. The dosed mouthwash is immediately transferred to the mouth and swished. A tingling organoleptic sensation is observed.

Example 40

Battery Packet

A 0.9 mL portion of the sphere triads from Example 10 are added to a foil packet and the packet is sealed. The packet is opened and the contents are dispensed into 8 fluid ounces of a liquid beverage. The beverage is consumed immediately, allowing the liquid to reside in the mouth for an extended period. A tingling organoleptic sensation is observed.

The packet may also contain other beverage concentrates, such as energy drink mix, sports drink mix, ice tea mix, punch mix, lemonade mix, etc. Such concentrates may be liquid or powder.

It will be appreciated that single serving sizes, multiple serving size, or bulk sized containers, and containers other than foil packets, for the sphere triads may be used. Dosing then may be controlled by the consumer and tailored to their liking.

Example 41

Alcoholic Beverage

Battery components are introduced to an alcoholic beverage such as liquors, cordials, aperitifs, digestifs, and liqueurs. A single serving of the alcoholic beverage is dosed with a 0.9 mL portion of the sphere triads from Example 10. The dosed alcoholic beverage is consumed immediately, allowing the liquid to reside in the mouth for an extended period. A tingling organoleptic sensation is observed.

Each of these examples indicates that the liquid is allowed to reside in the mouth for an extended period of time. For testing purposes, small amounts of liquid were used, and retained in the mouth for an extended period to evaluate the organoleptic effect. In real world examples, normal drinking patterns can be used with or without straws. The passing of the liquid over the lips, gums and tongue and any incident contact with the sides or roof of the mouth during normal drinking and swallowing can be sufficient to achieve the organoleptic effect. Nothing herein is meant to imply that the liquid must be retained for longer than normal periods—or, on the other hand, that the liquid may not be retained for longer than normal periods.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of "operably couplable" include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A battery comprising:
   one or more encapsulated anodes comprising a liquid anode material surrounded by an anodic membrane;
   one or more encapsulated cathodes comprising a liquid cathode material surrounded by a cathodic membrane; and
   an electrolyte,
   wherein the cathodic membrane additionally encapsulates one or more of the encapsulated anodes or the anodic membrane additionally encapsulates one or more of the encapsulated cathodes, and
   wherein the one or more encapsulated anodes, the one or more encapsulated cathodes, and the electrolyte are configured to generate an electrical current upon a breach of the anodic membrane and the cathodic membrane.

2. The battery of claim 1, wherein the liquid anode material comprises a food grade anode material, and wherein the liquid cathode material comprises a food grade cathode material.

3. The battery of claim 2, wherein the food grade anode material is selected from the group consisting of zinc, nickel, aluminum, magnesium, and any combination thereof.

4. The battery of claim 2, wherein the food grade cathode material is selected from the group consisting of copper sulfate, copper, carbon, manganese dioxide, iron, copper gluconate, and any combination thereof.

5. The battery of claim 1, wherein the battery is suitable for consumption by mammals.

6. The battery of claim 1, wherein the anodic membrane and the cathodic membrane comprise a polysaccharide.

7. The battery of claim 6, wherein the polysaccharide is cross-linked with a divalent cation.

8. The battery of claim 1, wherein the anodic membrane and the cathodic membrane are each coated with an additional layer comprising a polysaccharide, a protein, or chitosan.

9. The battery of claim 1, wherein the one or more encapsulated anodes and the one or more encapsulated cathodes are configured to rupture, dissolve, or excrete.

10. The battery of claim 1, wherein the electrolyte is selected from the group consisting of phosphoric acid, ascorbic acid, citric acid, salt, and any combination thereof.

11. The battery of claim 1, wherein the battery is a beverage suitable for consumption by a mammal.

12. A battery comprising:
    one or more encapsulated anodes comprising a liquid anode material surrounded by an anodic membrane;
    one or more encapsulated cathodes comprising a liquid cathode material surrounded by a cathodic membrane; and
    one or more encapsulated electrolytes comprising spheres:
    wherein each of the one or more encapsulated electrolytes comprises an electrolytic membrane configured to encapsulate an electrolyte;
    wherein the electrolytic membrane additionally encapsulates one or more of the encapsulated anodes, encapsulates one or more of the encapsulated cathodes, encapsulates one or more of both the encapsulated anodes and the encapsulated cathodes, is encapsulated by the anodic membrane, is encapsulated by the cathodic membrane, or a combination thereof, and
    wherein the one or more encapsulated anodes, the one or more encapsulated cathodes, and the one or more encapsulated electrolytes are configured to generate an electrical current upon a breach of the anodic membrane, the cathodic membrane, and the electrolytic membrane.

13. The battery of claim 12, wherein the one or more encapsulated electrolytes are configured to rupture, dissolve, or excrete.

14. The battery of claim 12, wherein the electrolytic membrane comprises a polysaccharide.

15. The battery of claim 14, wherein the polysaccharide is cross-linked with a divalent cation.

16. The battery of claim 12, wherein the electrolytic membrane is coated with an additional layer comprising a polysaccharide, a protein, or chitosan.

17. The battery of claim 1, wherein the battery further comprises a fluid selected from the group consisting of soda, syrup, fruit juice, water, mineral water, carbonated water, ethanol, milk, energy drink, tea, coffee, energy drink, shampoo, soap, deodorant, lubricant and any combination thereof.

18. A method of making an encapsulated battery component, the method comprising:
    combining at least one battery component and a first membrane forming substance in a first liquid to form a first solution;
    combining a second membrane forming substance in a second liquid to form a second solution; and
    adding either a portion of the first solution to the second solution or a portion of the second solution to the first solution to form an encapsulated battery component, wherein the battery component is an electrode, an electrolyte, or any combination thereof.

19. The method of claim 18, wherein the battery component is an electrode which comprises a liquid electrode material.

20. The method of claim 18, wherein the electrode is an anode comprising a liquid anode material.

21. The method of claim 18, wherein the electrode is a cathode comprising a liquid cathode material.

22. The method of claim 18, wherein the battery component comprises a liquid electrolyte material.

23. A composition comprising:
   a carrier liquid; and
   a battery, wherein the battery comprises:
      one or more encapsulated anodes comprising an liquid anode material surrounded by an anodic membrane;
      one or more encapsulated cathodes comprising a liquid cathode material surrounded by a cathodic membrane; and
      an electrolyte,
      wherein the cathodic membrane additionally encapsulates one or more of the encapsulated anodes or the anodic membrane additionally encapsulates one or more of the encapsulated cathodes, and
      wherein the one or more encapsulated anodes, the one or more encapsulated cathodes, and the electrolyte are configured to generate an electrical current upon a breach of the anodic membrane and the cathodic membrane within the carrier liquid.

24. The composition of claim 23, wherein the carrier liquid is a beverage.

\* \* \* \* \*

UNITED STATES PATENT AND TRADEMARK OFFICE
CERTIFICATE OF CORRECTION

PATENT NO. : 8,828,581 B2  
APPLICATION NO. : 13/816435  
DATED : September 9, 2014  
INVENTOR(S) : Godden Page 1 of 1

It is certified that error appears in the above-identified patent and that said Letters Patent is hereby corrected as shown below:

In the Specification

In Column 18, Line 5, delete "anodes" and insert -- anodes [1140] --, therefor.

Signed and Sealed this
Seventeenth Day of March, 2015

Michelle K. Lee
*Director of the United States Patent and Trademark Office*